(12) United States Patent
Ohta

(10) Patent No.: US 7,707,494 B2
(45) Date of Patent: Apr. 27, 2010

(54) INFORMATION PROCESSING APPARATUS, CONTROL METHOD THEREFOR, AND PROGRAM

(75) Inventor: Satoshi Ohta, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 812 days.

(21) Appl. No.: 11/193,385

(22) Filed: Aug. 1, 2005

(65) Prior Publication Data

US 2006/0031761 A1 Feb. 9, 2006

(30) Foreign Application Priority Data

Aug. 6, 2004 (JP) ............................. 2004-231440

(51) Int. Cl.
*G06N 3/00* (2006.01)
(52) U.S. Cl. .................................................... 715/243
(58) Field of Classification Search ................. 715/243, 715/788
See application file for complete search history.

(56) References Cited

U.S. PATENT DOCUMENTS

| 5,862,297 | A  | * | 1/1999  | Timmermans ............... 386/70 |
| 2002/0049702 | A1 |   | 4/2002  | Aizikowitz et al. ............. 707/1 |
| 2002/0144226 | A1 |   | 10/2002 | Nitta et al. ..................... 716/11 |
| 2004/0145593 | A1 | * | 7/2004  | Berkner et al. ............... 345/619 |
| 2004/0151399 | A1 | * | 8/2004  | Skurdal et al. ............... 382/266 |
| 2004/0163047 | A1 |   | 8/2004  | Nagahara et al. ............ 715/517 |
| 2004/0230558 | A1 | * | 11/2004 | Tokunaka ....................... 707/1 |
| 2004/0236743 | A1 | * | 11/2004 | Blaicher et al. ................ 707/7 |
| 2005/0231691 | A1 | * | 10/2005 | Li ................................. 353/69 |
| 2006/0139379 | A1 | * | 6/2006  | Toma et al. ................. 345/698 |

FOREIGN PATENT DOCUMENTS

| CN | 1510593       | 7/2004  |
| JP | 7-129658      | 5/1995  |
| JP | 9-50535       | 2/1997  |
| JP | 2001-92820    | 4/2001  |
| KR | 2002-13555    | 2/2002  |
| WO | WO 00/72235   | 11/2000 |

OTHER PUBLICATIONS

Bederson et al., "Pad++: A Zoomable Graphical Interface," 1994, pp. 1-2.*
Bederson et al., "Pad++: A Zoomable Graphical INterace System," May 1995, pp. 1-2.*
Bederson et al., "Implementing a Zooming User Interface: Experience Building Padd++," Aug. 1998, pp. 1-35.*

* cited by examiner

*Primary Examiner*—Kyle R Stork
(74) *Attorney, Agent, or Firm*—Fitzpatrick, Cella, Harper & Scinto

(57) ABSTRACT

A reference size when data of a data field is laid out in a page is decided on the basis of the data display sizes of data fields having the same data field name in a plurality of types of records. A data field having a data display size corresponding to the decided reference size is chosen from the data fields having the same data field name in the plurality of types of records. Data of the data field is laid out in the page on the basis of the data display size of the chosen data field.

9 Claims, 23 Drawing Sheets

FIG. 5A
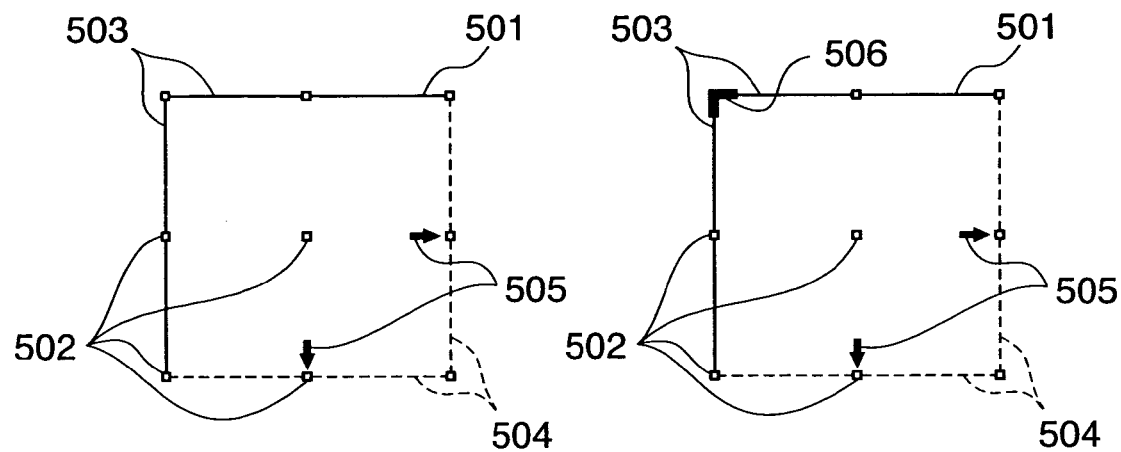
FIG. 5B
FIG. 5C
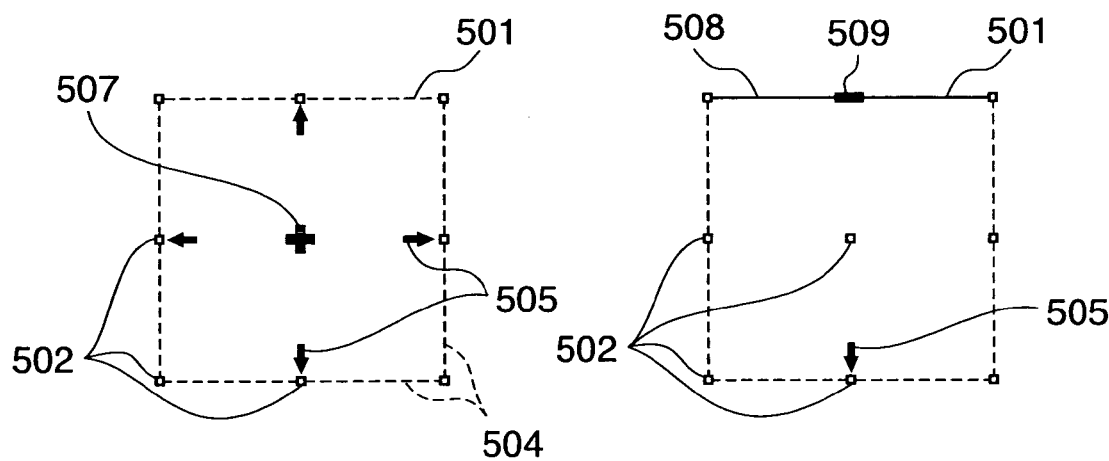
FIG. 5D

FIG. 7A
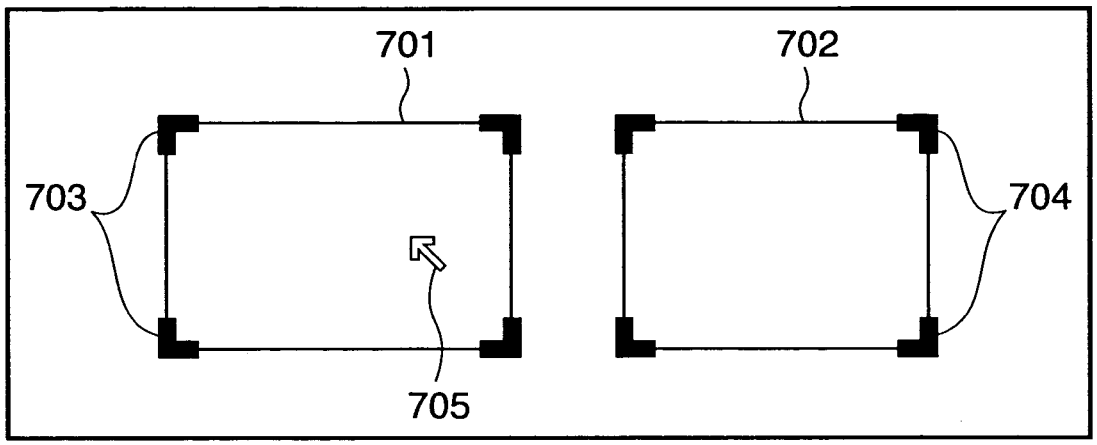
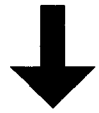
FIG. 7B
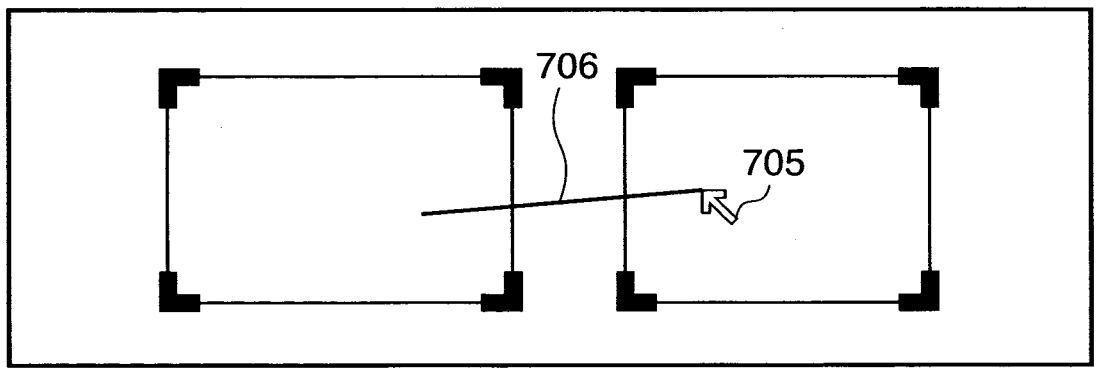
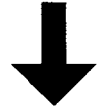
FIG. 7C
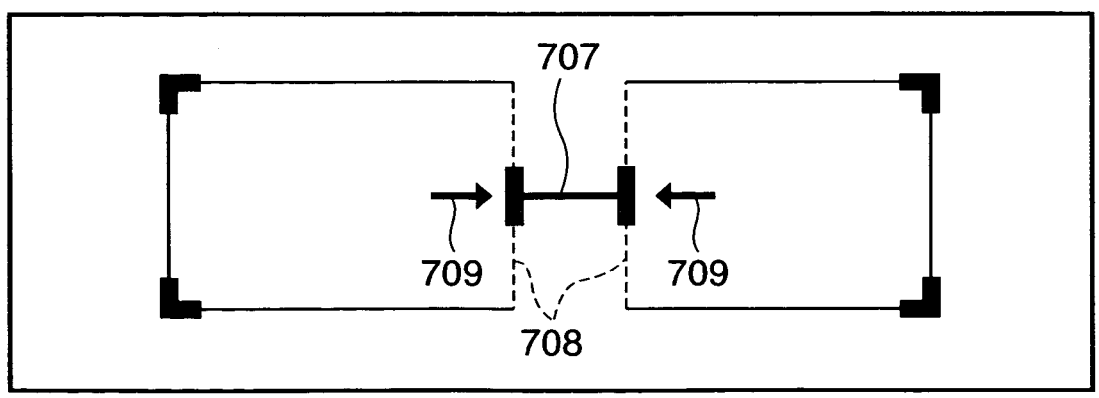

FIG. 11A
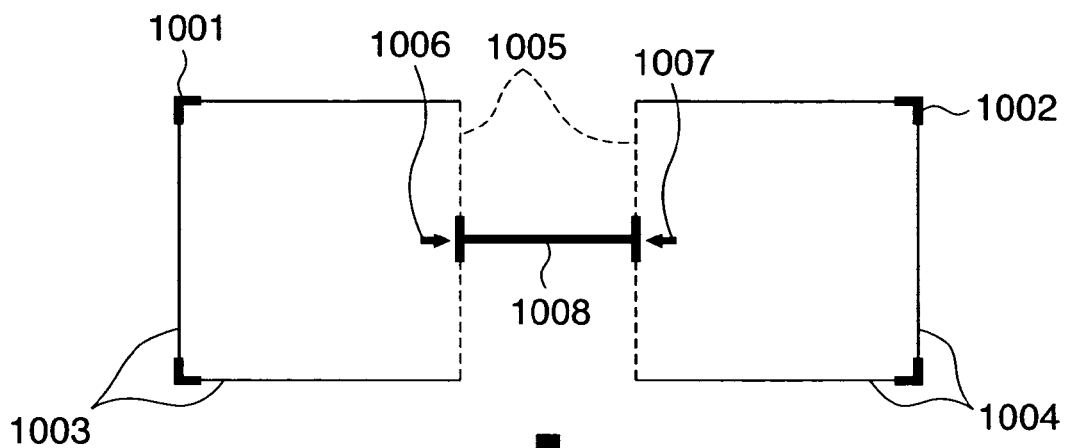
FIG. 11B
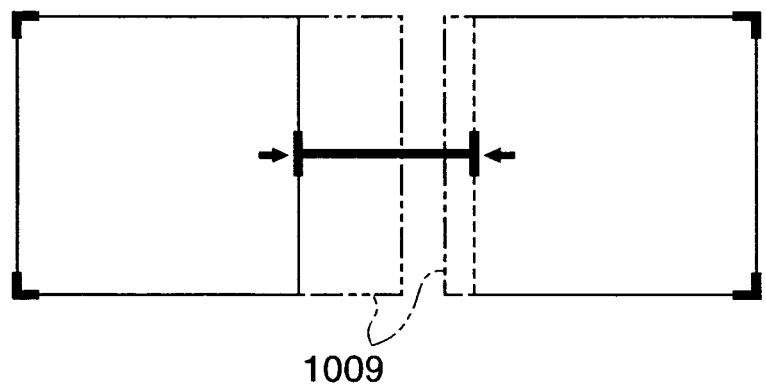
FIG. 11C
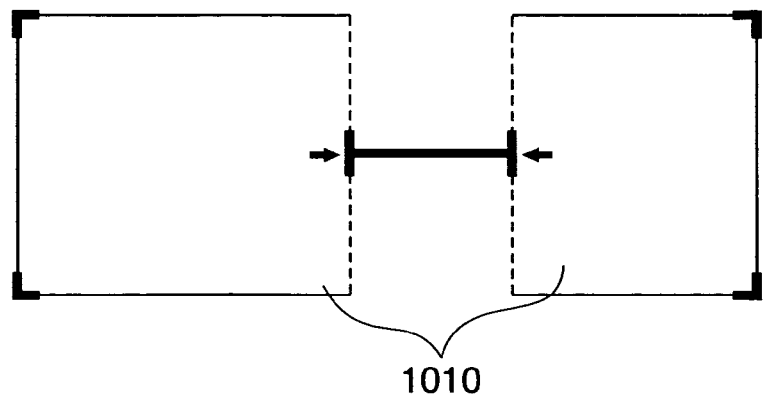

FIG. 12

DATABASE TABLE

| RECORD NUMBER | PRODUCT NAME CONCEPT | PRODUCT IMAGE | FEATURE 1 | FEATURE 2 | DESCRIPTION | — |
|---|---|---|---|---|---|---|
| 0 | IXY Imagination Flexibility Performance | IXY 400jpg | SWITCHABLE BETWEEN HIGH-SPEED CONTINUOUS SHOOTING (APPROXIMATELY 2.5 IMAGES/SEC) AND STANDARD CONTINUOUS SHOOTING (APPROXIMATELY 1.5 IMAGES/SEC). ……… | OPTIMAL WHITE BALANCE CAN BE SET TO MATCH VARIOUS LIGHT SOURCES. (AUTO/SUNLIGHT/ CLOUDY/LIGHT BULB/ FLORESCENT/ FLUORESCENT H/ MANUAL) | WITH AiAF, THE CAMERA AUTOMATICALLY FOCUSES ACCURATELY. IXY DIGITAL 400 SETS A 9-POINT FOCUSING FRAME. WITH THIS SETTING, AF POINTS SCATTER IN A WIDE RANGE OF THE VIEWFINDER, AND ……… | …… |
| 1 | …… | …… | …… | …… | …… | …… |
| 2 | …… | …… | …… | …… | …… | …… |
| 3 | IXY L Style/ Quality/ Potential/ Operation | IXY L.pg | THE CAMERA AUTOMATICALLY ADJUSTS THE FOCUS AT FIVE AF POINTS ARRANGED IN A CROSS. THIS REALIZES FREE FRAMING AND ACCURATE FOCUSING WITHOUT LIMITING THE POSITION OF A ……… | A MORE STYLISH AND SLIM IXY DIGITAL L IN SOPHISTICATED FOUR COLORS. A SLIM & LIGHTWEIGHT BODY MADE OF A NEW MATERIAL, ALUMINUM-MAGNESIUM ALLOY, IS 18.5mm THIN ……… | ONLY A MINIMUM NUMBER OF CONTROL BUTTONS ARE ARRANGED ON THE BACK FOR SIMPLE AND EASY OPERATION. FURTHER, THE FUNCTION BUTTON AND OMNISELECTOR BUTTON ARE EMPLOYED ……… | …… |
| 4 | …… | …… | …… | …… | …… | …… |

INFORMATION PROCESSING APPARATUS, CONTROL METHOD THEREFOR, AND PROGRAM

FIELD OF THE INVENTION

The present invention relates to an information processing apparatus which lays out, in a page, field areas for inserting data of a plurality of types of data fields contained in a record, a control method therefor, and a program.

BACKGROUND OF THE INVENTION

The necessity for CRM (Customer Relationship Management) and one-to-one marketing has recently received a great deal of attention due to factors such as shortening of the product life as varieties of products are produced, and customer's orientation to customized services as the use of the Internet spreads. These methods try to raise the customer satisfaction, win new customers, and keep customers.

One-to-one marketing is a kind of database marketing which creates a database of individual attribute information including the age, gender, hobby, preference, and purchase log of a customer, analyzes the contents of the database, and makes a proposal complying with customer's needs. A typical method of this marketing is variable printing. These days, a variable printing system which customizes a document for each customer and outputs the document has been developed along with the development of the DTP (Desk Top Publishing) technique and the pervasion of digital printing apparatuses. The variable printing system needs to create a customized document in which contents of a different amount for each customer are optimally laid out.

Generally, when such a customized document is to be created by the variable printing system, containers are laid out in a document. The container is a drawing area for drawing contents (drawing contents (e.g., an image and text)), and is also called a field area.

A desired customized document (called a template) can be created by performing work of laying out containers in a document and associating a database with the layout (associating various contents in the database with the containers). The contents of the customized document can be changed (made variable) by properly switching contents in the containers in the customized document (changing the association). Such a document is called a variable data document, and a printing system using the variable data document is a variable printing system.

In a conventional variable printing system, the size of a container associated with a text or image serving as contents is fixed. When contents in the database are inserted (flowed) into a container and the data amount is larger than the container size, the following problems arise. That is, if the data is a text, overlapping of the text in the container occurs. If the data is an image, clipping of the image by the container occurs. When the data amount is smaller than the container size, no proper display may be obtained such that a gap appears between the container and its internal contents.

In order to solve these problems, there is proposed an automatic layout system which changes the container size in accordance with the information amount. The automatic layout system can flexibly set the container sizes of a text and image. Some automatic layout systems can provide a flexible container size and change a container to a large size in accordance with the data amount to be inserted. There is also proposed a technique of, when data of a text which cannot fall within a fixed container size is inserted, adjusting (reducing) the font size of the text and displaying all the text within a container.

When, however, the size of a container is increased, the container overlaps another container in a document. In adjusting the font size of a text, the font size becomes excessively small when the amount of text to be processed is large. In order to solve these problems, as another technique of changing the layout, a technique of downsizing a container adjacent to a target container when the target container increases in size is disclosed in Japanese Patent Laid-Open No. 7-129658 (paragraph 0049, FIG. 8) "Layout Designing Apparatus".

Japanese Patent Laid-Open No. 2001-092820 proposes a technique of manually adjusting a layout result which is greatly different from an original in format and size as a result of an automatic layout process based on the original, editing an inserted character string one by one, comparing the editing result with the original, and when no difference between them is detected, completing editing.

The layout designing apparatus disclosed in Japanese Patent Laid-Open No. 7-129658 manages the priorities of layout materials, lays out materials in the order of priorities, and decides the layout. That is, the layout designing apparatus only decides the order of laying out target materials each serving as a layout unit. In this case, an area for a layout material of the lowest priority always becomes narrow, and a layout desired by the user cannot be obtained.

The apparatus in Japanese Patent Laid-Open No. 7-129658 is limited to a so-called DTP technique of editing inserted content data itself to adjust the whole layout, and laying out fixed content data.

In the variable printing system as a purpose of the present invention, editing of content data inserted into a container means editing of content data stored in a database, which makes variable printing insignificant.

Hence, the layout need be adjusted not by adjusting content data itself, but by optimally adjusting the size of a container for inserting content data on the basis of the inserted content data. There is also a need to more efficiently perform operation for this adjustment.

In this technical field, a mechanism has been devised which dynamically lays out each record by making containers push each other on the basis of the size of data inserted (flowed) into each container laid out in a page. By adopting this mechanism, the layout can be changed for each record, and a printed material which minimizes a gap and overflow can be obtained.

However, with the mechanism of dynamically laying out each record, the operator cannot recognize the layout before a printed material is output. The layout can be previewed before printing, but it is not practical to preview all pages because the database may hold thousands of records in variable printing.

For this reason, demands arise for creating the design of a template while allowing the operator to recognize the layout to a certain degree when a dynamic layout is applied.

SUMMARY OF THE INVENTION

The present invention has been made to overcome the conventional drawbacks, and has as its object to provide an information processing apparatus which lays out, in a page, field areas for inserting data of a plurality of types of data fields on the basis of the data display sizes of the data fields contained in a plurality of records, a control method therefor, and a program.

According to the present invention, the foregoing object is attained by providing an information processing apparatus which lays out, in a page, a field area for inserting data of a data field selected from a record formed from a plurality of types of data fields, comprising:

deciding means for deciding a reference size when the field area for inserting the data of the data field is laid out in a page on the basis of respective data display sizes of data fields having the same data field name in a plurality of records;

choosing means for choosing a data field having a data display size corresponding to the reference size decided by the deciding means from the data fields having the same data field name in the plurality of records; and layout means for laying out, in the page, the field area for inserting the data of the data field on the basis of the data display size of the data field chosen by the choosing means.

In a preferred embodiment, the deciding means decides the reference size for each of the plurality of types of data fields in the record, and the choosing means chooses a data field having a data display size corresponding to the reference size decided by the deciding means for each of the plurality of types of data fields, and creates a reference data field set from chosen data fields.

In a preferred embodiment, the apparatus further comprises:

display means for displaying an operation window for laying out, in the page, a field area for inserting a data field in the reference data field set; and selecting means for selecting a desired data field from the data field set in the operation window, wherein the layout means lays out, in the page, the field area for inserting the data of the data field on the basis of the data display size of the data field selected by the selecting means.

In a preferred embodiment, the reference size is at least one of an average data display size, a maximum data display size, and a minimum data display size of the data fields having the same data field name in the plurality of records.

In a preferred embodiment, the deciding means comprises calculating means for, when data of a data field to be processed is image data, calculating a data display size of the image data from longitudinal and lateral sizes of the image data, and when the data is text data, calculating a data display size of the text data on the basis of designated font information.

In a preferred embodiment, when the reference size is an average data display size of the data fields having the same data field name in the plurality of records, the choosing means chooses a data field having a data display size closest to the average data display size from the data fields having the same data field name in the plurality of records.

In a preferred embodiment, the apparatus further comprises:

display means for displaying an operation window for laying out, in the page, a field area for inserting data of a data field in the reference data field set; and display control means for displaying a data type, a data field name, data, or a data file name as field information of the data field that is displayed in the operation window.

In a preferred embodiment, the apparatus further comprises:

display means for displaying an operation window for laying out, in the page, a field area for inserting data of a data field in the reference data field set, and a page window of the page in which the field area is laid out; and operating means for selecting a desired data field from a data field set in the operation window, dragging and dropping the desired data field onto the page window, and laying out, in the page, a field area for inserting data of the data field.

In a preferred embodiment, the apparatus further comprises display means for displaying an operation window for laying out, in the page, a field area for inserting data of a data field in a data field set which forms the record, or the reference data field set, wherein the operation window switches and displays one of data field sets which respectively form the plurality of records, or the reference data field set.

In a preferred embodiment, the apparatus further comprises:

inserting means for inserting data of a plurality of types of data fields contained in the record into corresponding field areas on a template page on which the layout means lays out field areas; and print data generating means for generating print data to be printed by a printing apparatus on the basis of the template page in which the data of the data fields are inserted by the inserting means.

According to the present invention, the foregoing object is attained by providing a method of controlling an information processing apparatus which lays out, in a page, a field area for inserting data of a data field selected from a record formed from a plurality of types of data fields, comprising:

a deciding step of deciding a reference size when the field area for inserting the data of the data field is laid out in a page on the basis of respective data sizes of data fields having the same data field name in a plurality of records; and a layout step of laying out, in the page, the field area for inserting the data of the data field on the basis of the size decided in the deciding step.

According to the present invention, the foregoing object is attained by providing a program for implementing control of an information processing apparatus which lays out, in a page, a field area for inserting data of a data field selected from a record formed from a plurality of types of data fields, comprising:

a program code for a deciding step of deciding a reference size when the field area for inserting the data of the data field is laid out in a page on the basis of respective data sizes of data fields having the same data field name in a plurality of records; and a program code for a layout step of laying out, in the page, the field area for inserting the data of the data field on the basis of the size decided in the deciding step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 5A is a view for explaining container display rules according to the embodiment of the present invention;

FIG. 5B is a view for explaining the container display rules according to the embodiment of the present invention;

FIG. 5C is a view for explaining the container display rules according to the embodiment of the present invention;

FIG. 5D is a view for explaining the container display rules according to the embodiment of the present invention;

FIG. 7A is a view showing an example of transition of the user interface in setting a link according to the embodiment of the present invention;

FIG. 7B is a view showing the example of transition of the user interface in setting a link according to the embodiment of the present invention;

FIG. 7C is a view showing the example of transition of the user interface in setting a link according to the embodiment of the present invention;

FIG. 11A is a view showing an example of the user interface in the layout calculation process according to the embodiment of the present invention;

FIG. 11B is a view showing the example of the user interface in the layout calculation process according to the embodiment of the present invention;

FIG. 11C is a view showing the example of the user interface in the layout calculation process according to the embodiment of the present invention;

FIG. 12 is a table showing an example of a database table according to the embodiment of the present invention;

DETAILED DESCRIPTION OF THE PREFERRED EMBODIMENT

A preferred embodiment of the present invention will be described in accordance with the accompanying drawings.

<System Configuration>

The hardware configuration of an information processing system and that of a host computer as a building component of the information processing system according to the embodiment will be described with reference to FIGS. 1A and 1B.

Figure 1A:
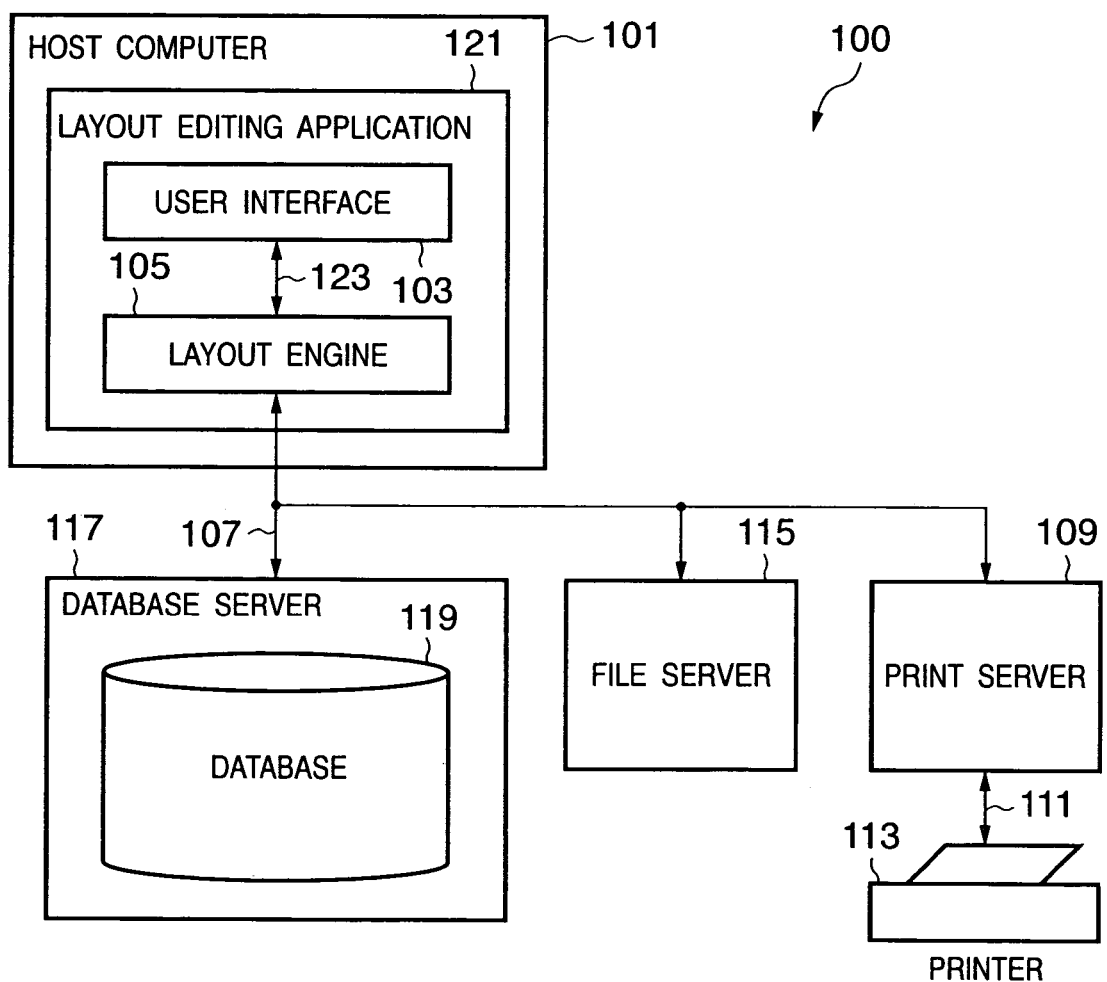
FIG. 1A is a block diagram showing an example of the configuration of an information processing system according to an embodiment of the present invention.

FIG. 1A is a block diagram showing an example of the configuration of the information processing system according to the embodiment of the present invention. FIG. 1B is a block diagram showing the hardware configuration of the host computer (corresponding to an information processing apparatus according to the present invention) as a building component of the information processing system according to the embodiment of the present invention.

Figure 1B:
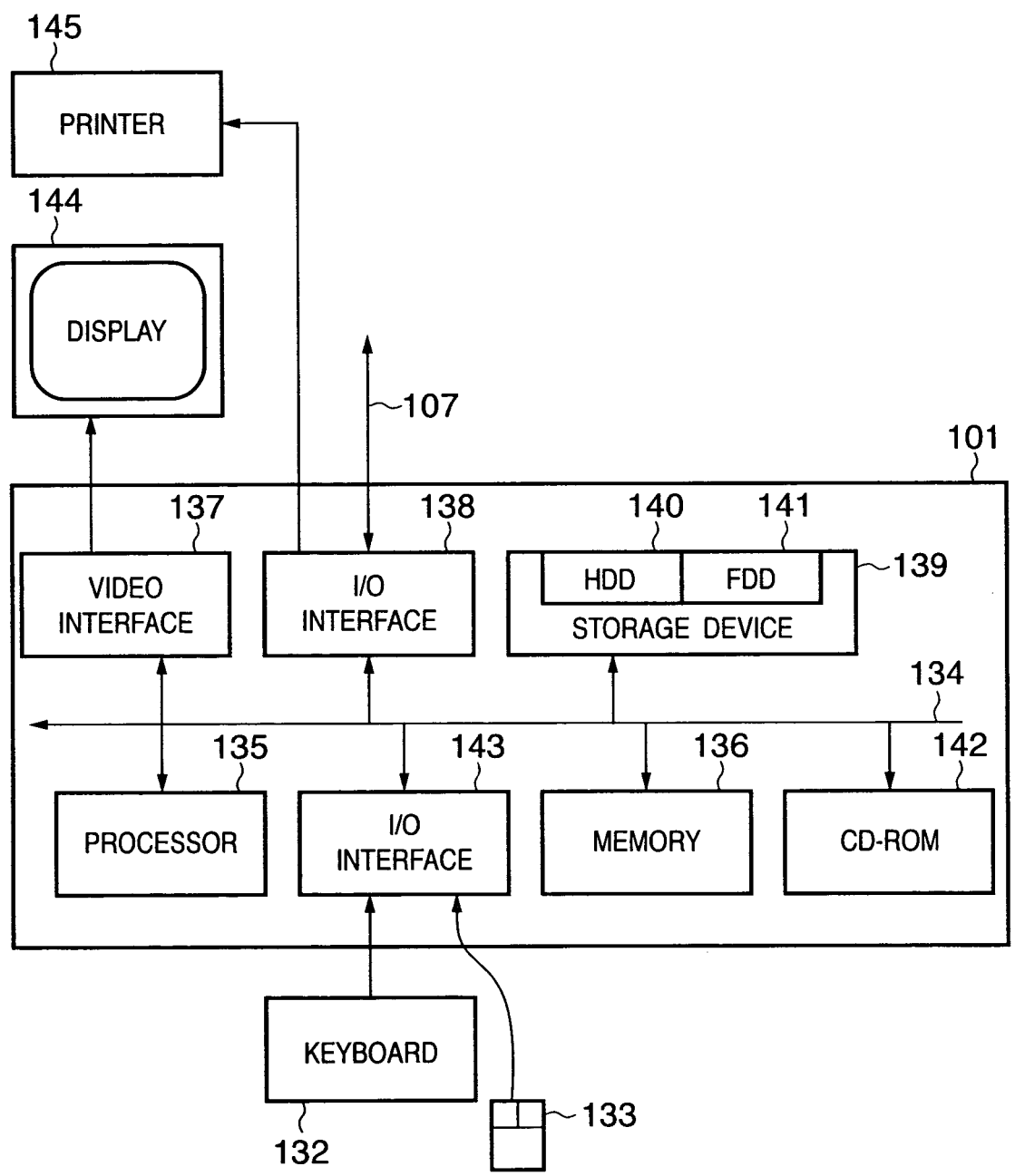
FIG. 1B is a block diagram showing the hardware configuration of a host computer as a building component of the information processing system according to the embodiment of the present invention.

Various computers (e.g., a database server 117, file server 115, and print server 109) other than the host computer in FIG. 1A also have the same hardware configuration as, e.g., that in FIG. 1B.

In FIG. 1A, an information processing system 100 is built by connecting a host computer 101, the database server 117, the file server 115, and the print server 109 via a network 107.

The database server 117 comprises a database 119. The print server 109 is connected to a printer 113, and can properly output print data received via the network 107 to the printer 113 and cause the printer 113 to print the print data.

The information processing system 100 in FIG. 1A especially shows an example of the configuration of a variable printing system which prints a variable data document. A variable printing process to be described in the embodiment is implemented by the host computer 101 (formed from a general-purpose computer module) which functions as a layout editing apparatus.

A layout editing application 121 which can run in the variable printing system 100 is executed completely or partially by the host computer 101. In particular, a process associated with layout editing and a process associated with printing of a variable data document are implemented by software which is executed by the host computer 101.

Software and computer programs such as the layout editing application 121 are stored in a computer-readable medium. The software and computer programs are loaded from the computer-readable medium into a memory 136 of the host computer 101, and executed. The computer-readable medium which stores software and computer programs is a computer program product. When the computer program product is used in, e.g., the host computer 101, an apparatus suitable for layout editing and variable printing of a variable data document is provided.

As shown in FIG. 1B, a keyboard 132 and a mouse 133 serving as a pointing device are connected as input devices to the host computer 101 via an I/O (Input/Output) interface 143. A display device 144 is also connected as an output device via a video interface 137. A printer 145 can also be connected via an I/O interface 138.

The I/O interface 138 also has a function of connecting the host computer 101 to the network 107. With the I/O interface 138, the host computer 101 can be connected via the network 107 to another computer apparatus (external device) in the variable printing system 100. Typical examples of the network 107 are a local area network (LAN) and wide area network (WAN).

As shown in FIG. 1B, the host computer 101 includes at least one processor 135, and a memory 136 which is formed from a semiconductor memory such as a random access memory (RAM) or read only memory (ROM). A storage device 139 includes a hard disk drive (HDD) 140 capable of exchanging data with a computer-readable medium which stores various data such as a program, and a floppy® disk drive (FDD) 141.

Although not shown in FIG. 1B, various storage devices such as a magnetic tape drive and memory card can also be used as the storage device 139. A CD-ROM drive 142 is provided as a nonvolatile data source (a computer program may also be provided by a CD-ROM).

The host computer 101 communicates with the building components 135 to 143 of the host computer 101 via an interconnection bus 134. This communication is realized by an operating system such as GNU/LINUX or Microsoft Windows®, or a method in a conventional operation mode of a computer system which typically complies with an operating system or is formed by a well-known related technique. That is, the building components 135 to 143 are connected via the interconnection bus 134 so that they can communicate with each other, and are used by an operating system installed in the host computer 101.

Conceivable examples of the host computer 101 shown in FIG. 1B are an IBM-compatible PC (Personal Computer), Sparcstation available from Sun, and a computer system including them.

<Outline of Layout Editing Application>

In the embodiment, the layout editing application 121 is resident in the hard disk drive 140, and controls execution and loading by the processor 135. Data fetched from the intermediary storage device of the layout editing application 121 and the network 107 use the memory 136 in response to the hard disk drive 140.

For example, an encoded program of the layout editing application 121 is stored in a CD-ROM or floppy® disk. This program is loaded into the host computer 101 via the corresponding CD-ROM drive 142 or floppy® disk drive 141, and installed in the hard disk drive 140.

As another example, the layout editing application 121 may be loaded from the network 107 into the host computer 101, and installed in the hard disk drive 140.

Various software programs including the layout editing application 121 may be loaded into the host computer 101 from a magnetic tape, a ROM, an integrated circuit, a magneto-optical disk, radio communication (e.g., infrared communication) between the host computer 101 and another device, a computer-readable card (e.g., a PCMCIA card), or another proper computer including e-mail communication, an intranet, or the Internet having recording information on a WEB site. They are examples of the computer-readable medium, and another computer-readable medium is obviously used.

In FIG. 1A, the layout editing application 121 causes the host computer 101 to implement variable printing (to be also referred to as variable data printing (VDP)), and includes two software components: a layout engine 105 and user interface 103.

The layout engine 105 is a software component for loading records one by one from variable data which are stored as records in the database 119, under constraints in size and position on a container (rectangular range) serving as a field area (partial area), and calculating, from the loaded variable data and the container constraints, the layout including the size and position of a container to which the loaded variable data is flowed.

In the embodiment, the layout engine 105 also performs a process of drawing variable data assigned to a container and generating an image of a variable data document. However, the present invention is not limited to this, and the layout engine 105 operates as an application which decides the size and position of each partial area (container) and outputs drawing information to a printer-driver (not shown). The printer driver may perform a variable data document image drawing process and generate print data.

The user interface 103 allows the user to set the layout and attribute of a container and create a document template. The user interface 103 provides a mechanism of associating each container in the document template with a data source (variable data (contents) in the database 119). The user interface 103 and layout engine 105 communicate with each other via a communication channel 123.

An example of the data source for generating a variable data document is the typical database 119 in the database server 117 which generally executes a database application and is formed from another computer.

The host computer 101 communicates with the database server 117 via the network 107. The layout editing application 121 generates a document template to be saved in the host computer 101 or the file server 115 which is generally formed from another computer.

The layout editing application 121 generates a variable data document which is formed from a document template merged with variable data. The variable data document is directly-printed by the printer 113 via the local file system of the host computer 101, the file server 115, or the print server 109.

The print server 109 is a computer which provides a network function to the printer 113 which is not directly connected to the network 107. The print server 109 and printer 113 are connected via a typical communication channel 111 (e.g., USB, IEEE 1394, or wireless LAN).

Another example of the configuration of the variable printing system 100 will be explained with reference to FIG. 1C.

Figure 1C:
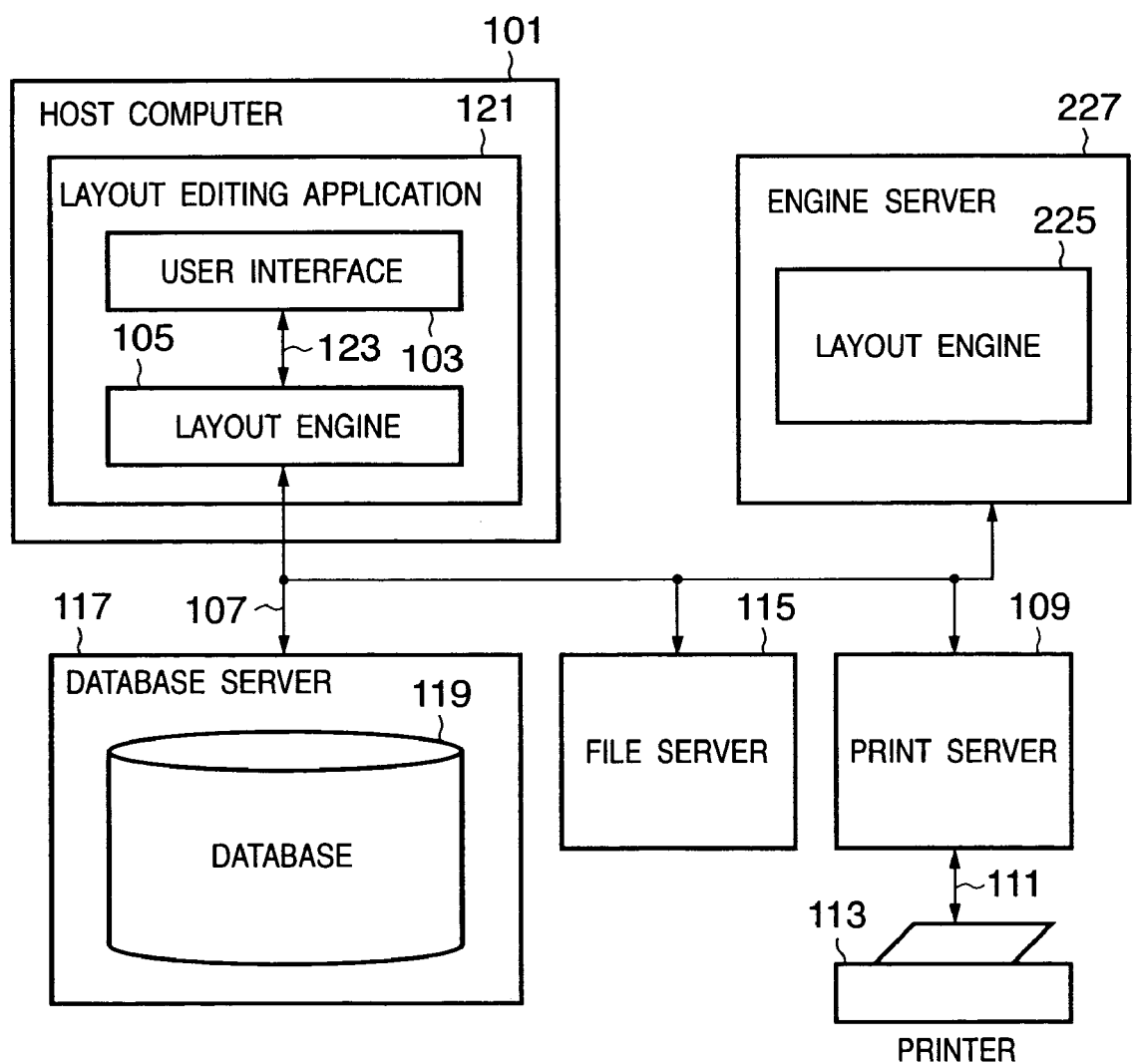
FIG. 1C is a block diagram showing another example of the configuration of the information processing system according to the embodiment of the present invention.

FIG. 1C is a block diagram showing another configuration of the information processing system according to the embodiment of the present invention.

FIG. 1C illustrates an example in which an engine server 227 is added to the network 107 and a layout engine 225 is installed in the engine server 227. That is, in this configuration, the layout engine 105 in the host computer 101 is implemented in the engine server 227. This configuration can reduce the process load of the host computer 101.

The engine server 227 is formed from a typical computer, similar to the remaining servers. A document template saved in the file server 115 can be combined with data saved in the database 119 in order to generate a document by the layout engine 225 for printing or another purpose. Such operation is requested via the user interface 103 or so requested as to print only a specific record.

The functional configuration of the host computer will be explained with reference to FIG. 1D.

Figure 1D:
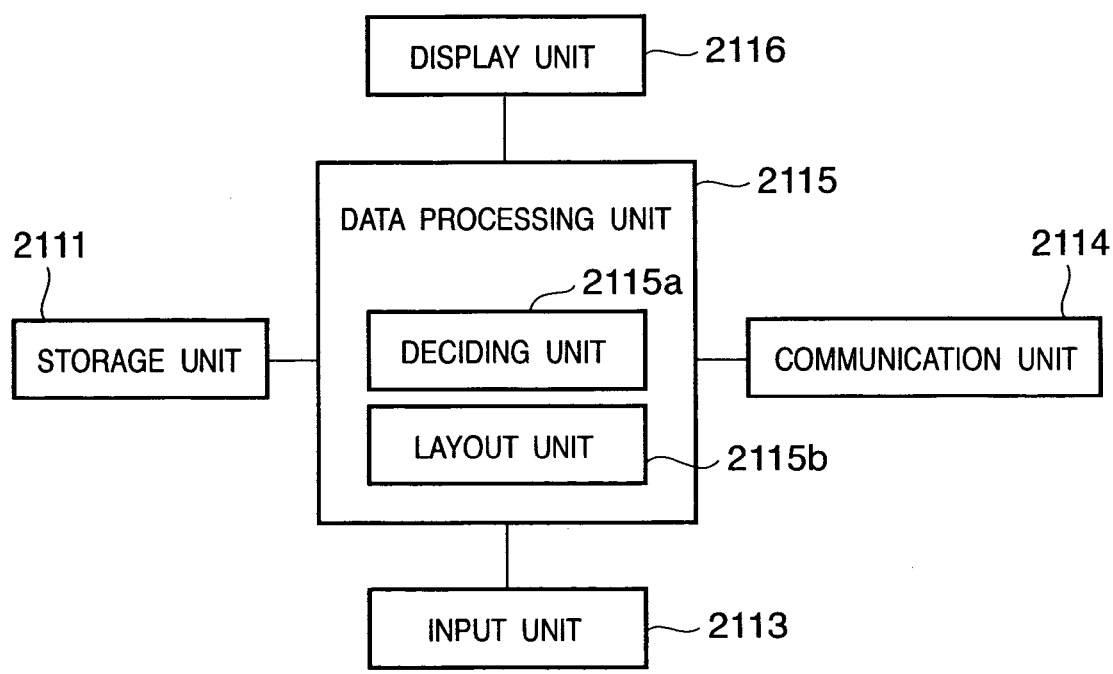
FIG. 1D is a block diagram showing the functional configuration of the host computer as a building component of the information processing system according to the embodiment of the present invention.

FIG. 1D is a block diagram showing the functional configuration of the host computer according to the embodiment of the present invention.

A data processing unit 2115 controls a storage unit 2111, display unit 2116, and input unit 113, and executes various processes (e.g., processes represented by the flowcharts of FIGS. 8, 9, 16, 18, and 19) realized by various programs such as a layout editing application 103.

The data processing unit 2115 has a function of laying out, in a page, field areas for inserting data of data fields selected from records made up of a plurality of types of data fields. As components which implement this function, the data processing unit 115 has at least a deciding unit 115a and layout unit 115b.

The deciding unit 2115a decides a reference size when field areas for inserting data of data fields are laid out in a page on the basis of the data sizes of data fields having the same data field name in a plurality of records.

The layout unit 2115b lays out, in a page, field areas for inserting data of data fields on the basis of a decided size.

FIG. 1D merely illustrates a configuration corresponding to constituent features defined by independent claim 1, and a configuration corresponding to the internal configuration of the data processing unit is also implemented for dependent claims of claim 1.

A communication unit 2114 is implemented by the I/O interface 138, and exchanges data via the network 107. The input unit 2113 is implemented by the keyboard 132 and mouse 133, and accepts an operation input from the user.

The display unit 2116 is implemented by the display 144, and displays the status of an operation input and image data in process. The storage unit 2111 is implemented by the storage device 139, and stores data to be processed and a database for storing records.

An outline of variable data printing will be explained with reference to FIG. 2.

Figure 2:
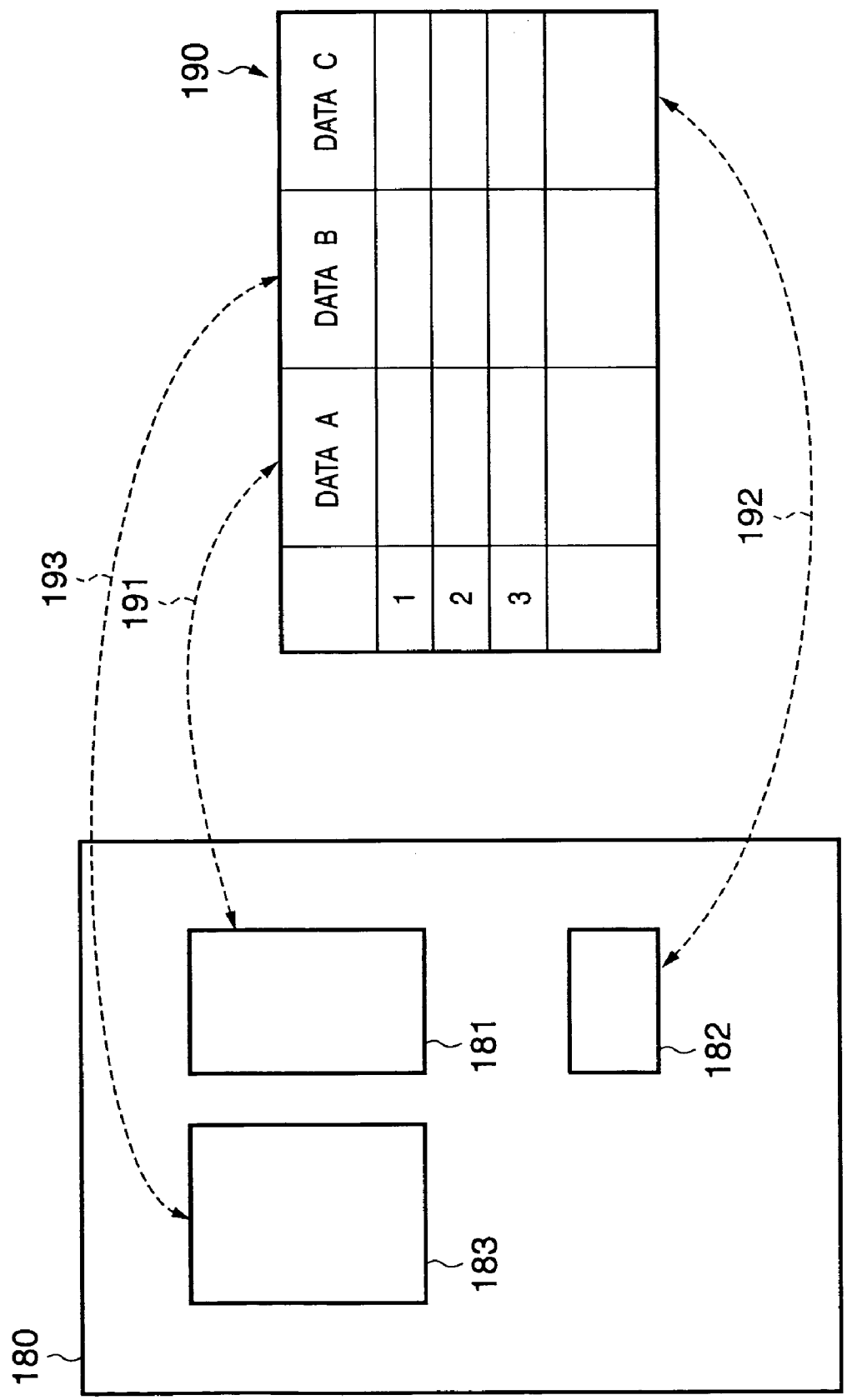
FIG. 2 is a view for explaining an outline of variable data printing according to the embodiment of the present invention.

FIG. 2 is a view for explaining an outline of variable data printing according to the embodiment of the present invention.

A plurality of containers 181 to 183 are laid out on a page in accordance with an operation instruction from the user via the user interface 103 of the layout editing application 121, and constraints on position and size are assigned to the containers to generate a document template 180.

The user interface 103 associates the document template 180 with a data source 190 (e.g., the database 119), and further associates each container with each data field in the data source 190. Association information representing the association between each container and each data field in the data source 190 is described in the document template 180, and the document template 180 is stored in the HDD 140. The data source 190 is a file which describes item data for each record, and is stored in the HDD 140.

The layout engine 105 loads data associated by association information from the data source 190 into the containers 181 and 182 of the document template 180 in accordance with a print instruction or preview instruction from the user. The layout engine 105 flows the loaded data of each record into the containers (e.g., flows data fields A to C of data record 1 into the containers 181 to 183). The layout engine 105 adjusts (adjusts the layout) the size of each container and the like in accordance with the flowed data.

For a preview instruction, the layout engine 105 generates a layout-adjusted document image, and previews it on the screen of the display device 144. For a print instruction, the layout engine 105 outputs, as print data to the print server 109, a document image generated using the layout engine 105 or printer driver. By sequentially processing data records 1, 2, 3, . . . , variable data printing is implemented.

<Description of Layout Editing Application>

The layout editing application 121 will be described.

An example of a user interface realized by the user interface 103 will be explained with reference to FIG. 3.

[Main Window]

Figure 3:
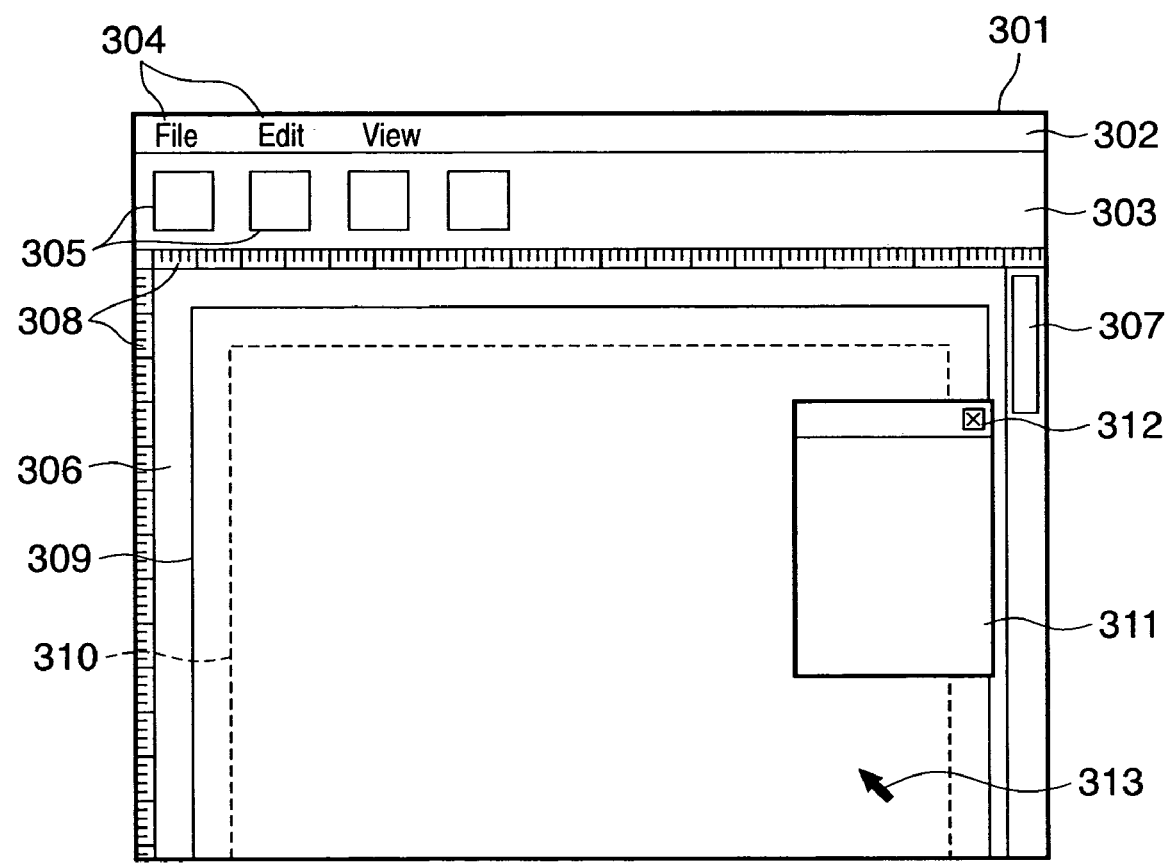
FIG. 3 is a view showing an example of a user interface according to the embodiment of the present invention.

FIG. 3 is a view showing an example of the user interface according to the embodiment of the present invention.

As shown in FIG. 3, the user interface 103 displays on the display device 144 a user interface which is formed by an application window 301 upon operation. The window 301 has a menu bar 302, tool bar 303, work area 306, and optional palette 311.

The menu bar 302 and tool bar 303 can be hidden or moved to various locations in the window. The location of the work area 306 can be moved by operation of the mouse 133. The palette 311 is an option, and can be controlled to be display/hidden in accordance with a purpose. A cursor/pointer 313 indicates the hotspot of the mouse 133.

As a known technique, the menu bar 302 has many menu items 304 expanded below the layer of a menu option.

The tool bar 303 has many tool buttons and widgets (components) 305 Which can be hidden or displayed in a special mode of the application.

A ruler 308 is an option, and is used to indicate the position of a pointer, page, line, margin guide, container, or object in the work area 306.

A palette 311 is used to access an additional function such as a variable data library. The palette 311 has a window control button 312 for moving, resizing, and closing the palette 311. The palette 311 can be displayed on the front surface of the work area 306 or on the back surface of an object. The palette 311 can be displayed only within the application window 301, or displayed partially or entirely outside the application window 301.

Figure 4:
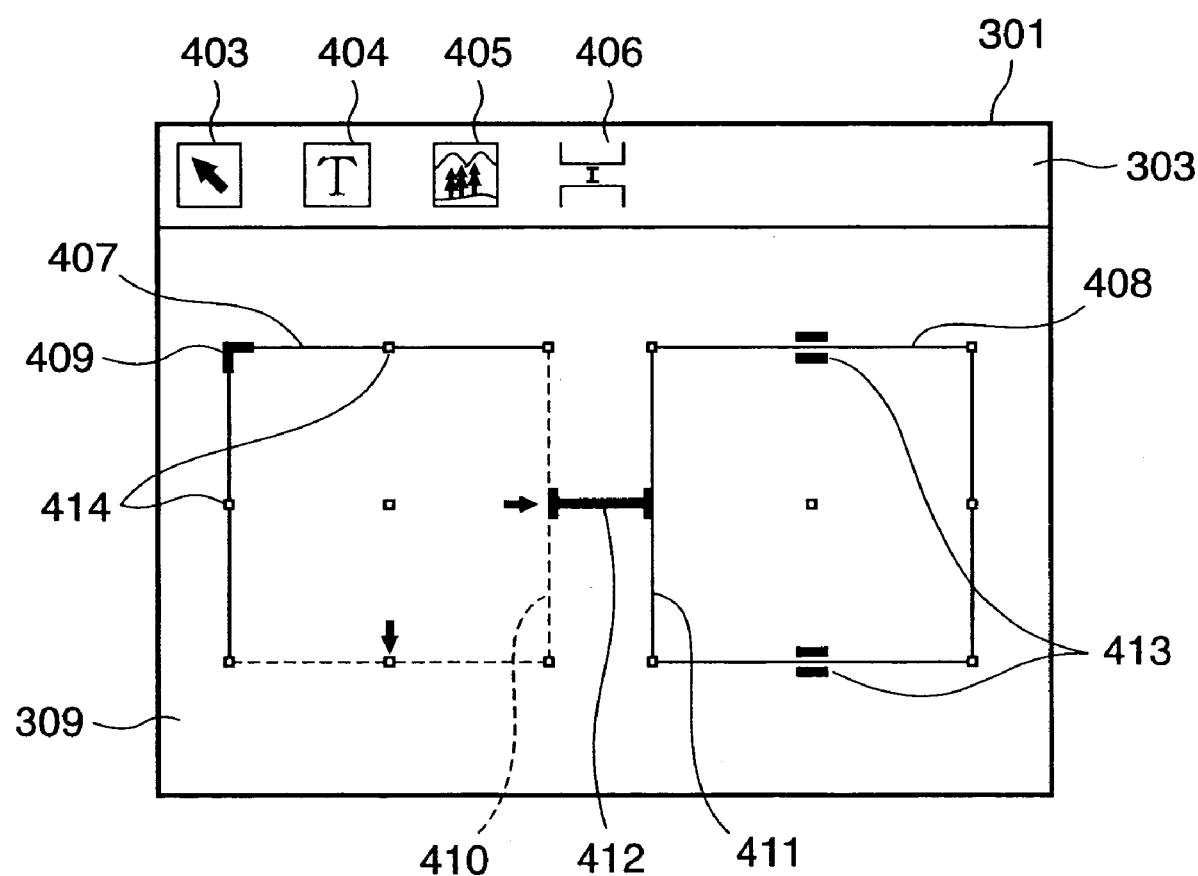
FIG. 4 is a view showing an example of display of a container in the user interface according to the embodiment of the present invention.

The tool bar 303 has a plurality of types of "buttons" 403 to 406 which can be selected by the user, as shown in FIG. 4.

(1) Selection tool button 403: The button 403 is used to select, move, resize, and lock/unlock the edge of a container. A container is selected by dragging a selection box around the container. A plurality of containers can be selected by selecting and operating them while pressing the CTRL key of the keyboard 132.

(2) Text container tool button 404: The button 404 is used to create a container having a static or variable text.

(3) Image container tool button 405: The button 405 is used to create a container having a static or variable image.

(4) Link tool button 406: The button 406 is used to create a link for associating containers, and also used to control the distance of a link.

As a known technique, these buttons are implemented as tool tips of icons which change in accordance with an operation status.

The application window 301 can decide a basic layout by laying out containers and links in a-page. The basic layout is a base for variable data printing. When each container in the basic layout is a fixed layout, the print results of all records have the same layout.

When each container in the basic layout is a flexible container (to be described later), the size and position of the container change in accordance with the amount-and size of data loaded from each record under-constraints (to be described later). Hence, a document template created by the layout editing application 121 decides only the basic layout.

When the document template contains a flexible container, the layout of a finally printed material is adjusted in accordance with loaded data.

[Document Template]

In FIG. 3, the work area 306 is used to display and edit the design of the document template (180: basic layout). The work area 306 can present an outline of a document to be printed to the user while the user designs a document template. From this preview, the user can easily understand how a document merged with the data source (190) changes depending on the amount and size of variable data.

When the data source is associated with the document template, corresponding variable texts and images are displayed in laid-out containers so as to preview a current document.

A document structure and visual clues (e.g., frame, anchor, slider, and link of a container) for drawing a container in the document template are always displayed in creating the document template. In preview for flowing variable data, visual clues are displayed when the cursor is moved onto a container or a container is selected.

The work area 306 includes a scroll bar 307, the optional ruler 308, and a document template 309. The document template 309 can show that a document has a plurality of pages. The document template 309 corresponds to the document template 180 in FIG. 2.

The page size of a given document template is designated by the user using a known technique. For example, a dialog for setting a page size is displayed by selecting "page setup" from "file" on the menu, and a page size designated by the user is reflected in the dialog.

The number of actual pages of each document may change depending on variable data in an associated data source. This is because an additional page is automatically created upon loading variable data which cannot be fit in one page when a field that changes in size depending on the variable data amount, like a flexible table, is set in the document template.

A boundary 310 displayed in each page is an arbitrary page margin which represents the maximum width of a printable object on the page.

FIG. 4 shows an example of objects which can be displayed in the document template 309 for one page.

Such objects are containers 407 and 408, an arbitrarily applied anchor icon 409, fixed edges 411 and 414, an unfixed edge 410, a link 412, and a slider 413.

The anchor icon 409 can be set at a corner or edge of a rectangular container or at the center of a container. When the anchor icon 409 is set, the position of the set anchor icon 409 is fixed. In the example of FIG. 4, the anchor icon 409 is set at the upper left corner of the container 407. In this case, variable data is flowed into the container 407. The anchor icon 409 shows that the container can be enlarged to the right or down when the image size or text amount of variable data is large.

When the anchor icon 409 is set at an edge, the edge is fixed, and the container can be enlarged along the three remaining edges. When the anchor icon 409 is set at the center of a container, the center position of the container is fixed, and the container can be enlarged in four directions so as not to change the center position of the rectangular container. The link 412 represents that the containers 407 and 408 are associated, though details of the link 412 will be described later. The link 412 also represents that the container 408 can be moved to the right while maintaining a length (range can be specified) set for the link 412. The slider 413 shows that it can be moved parallel to an edge at which the slider 413 is set.

[Container]

A container serving as a field area for inserting data of a plurality of types of data fields contained in each record in the database will be explained. The container is a field area (to be referred to as a partial area) where a fixed or flexible text and-image (data in a plurality of types of data fields) are flowed from a variable data file into a document template and drawn. The container is laid out together with other containers and objects, as shown in FIG. 4. The container is moved, adjusted in size, or created again by operation of the mouse 133 in accordance with an operation instruction from the user via the user interface.

More precisely, the container has a set of settings, visual representation, interaction, and editing operation. The definition of the container in the embodiment will be described.

(1) A container has fixed or flexible contents. Flexible contents (variable data) can be said to be dynamic in a sense that data acquired from the data source may change for each document, i.e., each record. Note that flexible contents in the embodiment are not intended to be animated contents or contents which change over time by another method because these contents are not suitable for printing.

Similarly, fixed contents are displayed in the same way for all documents generated using containers. When, however, a link to flexible contents is set, fixed contents may change in position in each document under the influence of the flexible contents.

(2) A container has decoration functions similar to text settings such as the background color, border, and font style which are applied to contents. These settings will be called container attributes. The container attributes can be set for each container, and a container can also be given the same container attributes as those of a given container.

(3) A container is merged with data from the data source when a document is generated. The decoration function is visible on a printout for any fixed contents. Flexible contents provide display of specific data from the data source. This representation of the container can be, for example, printed and/or also displayed on the screen of the display device 144.

(4) A container has a user interface as a visual clue, as shown in FIG. 4. For example, a container has an interactive graphical user interface (GUI) for editing a container and setting its display. GUI components are displayed on the screen of the display device 144, but are not printed in a document. The user interface 103 of the layout editing application 121 displays some of the container decoration functions such as the background color and font, and has a function of enabling editing and displaying container settings.

Examples of special purposes of the user interface function are a border, or a corner icon for interactively changing and displaying the size and position of a container, an overwrite number, a line, an icon, and a text, which represent container operation when a container is merged with data from the data source.

[Container Constraints]

The container has constrains on controlling how to link contents displayed in each document. These constraints (including linking of fixed/flexible contents to a container) are a major method of controlling generation of many documents from one document template by the user.

An example of the constraints is "the height of contents in this container is 4 inches at maximum". Another example of the constraints is "the left edge of contents in the container must be displayed at the same horizontal position in respective documents". The descriptions of the constraints provide various methods for displaying and editing these constraints by using the GUI.

A content place holder which designates the layout of fixed contents, like an image which has a defined place on a page, is well known in the digital printing technique. A container has a position and size, which are edited and displayed by a method known in a conventional technique. The following description is focused on display and editing by a method specialized in variable data printing.

By using a container, the user can designate the size (drawing size) and position of contents in a document. Since a plurality of types of documents are generated from one document template, many possibilities and constraints are set on a container. For these settings (designation) and display, a predetermined user interface is exploited.

The edge of one container defines a virtual boundary within which associated contents are displayed in a document. Hence, a discussion about the left edge of a container is a discussion about the leftmost edge in an area in which associated contents can be displayed in each document. Similarly, a discussion about the height of a container is understood to be a discussion about constraints on the height of associated contents in a generated document. In this specification, this distinction will become apparent when the edge or size of a container is discussed by referring to the user interface 103.

In the following description, a term "fixed" which defines a given value used to constrain display of contents applies to all documents.

(1) When the width of a container is fixed, a width assigned to associated contents is equal in all documents.

(2) When the height of a container is fixed, a height assigned to associated contents is equal in all documents.

(3) When the distance (length of a link) is fixed, a designated distance acts as a constraint in all documents.

(4) When the right and left edges of a container are fixed, the horizontal positions of the edges of a page are identical in all documents. However, the height or vertical position of a container may change. For example, when the left edge of a container is fixed, the position of the left edge is identical in all documents, but the display position of associated contents may change so that they are displayed at an upper portion on a page in a given document but at a lower portion on a page in another document.

(5) When the upper and lower edges of a container are fixed, the vertical positions of the edges of a page are identical in all documents. However, the width or horizontal position of a container may change in each document.

(6) The vertical axis of a container is a virtual vertical line which is parallel to the right and left edges of the container and positioned between them. If the vertical axis of a container is fixed, the average (i.e., center position between the right and left edges) of the horizontal positions of the right and left edges of the container is identical in all documents. Under this constraint, the width of a container may change. However, the vertical axis is at the same horizontal position in all documents including a document whose right and left edges are the farthest from the vertical axis and a document whose right and left edges are the closest to the vertical axis. The height and vertical position of a container are not influenced by this constraint.

(7) Similarly, if the horizontal axis is fixed, the average of the upper and lower edges of a container coincides with the same vertical position. However, the width and horizontal position of a container are not influenced by this constraint.

(8) When both the horizontal and vertical axes are fixed, this means that the center position of a container is fixed. However, the width and height of a container are not influenced by this constraint.

(9) When the corner position of a container, the intermediate position of the edge of the container, or the center position of the container is fixed, the fixed position is identical in all documents. For example, if the upper left corner of a container is fixed, the upper left position of a laid-out container is identical in all documents.

(10) A vertical edge or axis can be fixed in association with the left or right edge of a page, a left or right page margin, or another horizontal position. Similarly, a horizontal edge or axis can be fixed in association with the upper or lower edge of a page, an upper or lower page margin, or another vertical position.

A term opposite to "fixed" is "flexible" which means that the edge, axis, corner, or intermediate position of a container, or a document constraint may change between documents (records). For example, the layout in a page is expected to dynamically change depending on the size and amount of variable data. For a specific container, its size and position may be desirably fixed or the four corners of a container at a corner of a page may be desirably fixed.

To meet these demands, the layout editing application 121 can properly set whether to fix or change (make flexible) an edge, axis, corner, intermediate position, or the like for each container (partial area). The user can create a desired basic layout when he decides the basic layout of the document template 180.

[Display and Editing of Container]

—Method of Creating New Container—

A container is described as either of two, text and image containers. The text container has a text and buried image. The image container has only an image.

As shown in FIG. 4, a new text container or image container is created on the document template 309 by clicking the text container tool 404 or image container tool 405 with the mouse 133 and dragging a rectangle onto the document template 309.

Alternatively, a container may be created by making a desired one of the text container tool 404 and image container tool 405 active and simply clicking on the document template 309. In this case, a container of a default size is inserted into the template in accordance with clicking of the mouse 133, and a dialog box or another prompt for setting the dimensions of the new container or the like is provided.

Note that the container size may be set by various methods so that the container size is automatically defined in advance or a container is created and laid out in accordance with a calculated schema. A generated container is selected with an input device such as a mouse, and operation such as designation of properties with right clicking is performed. Then, the property dialog of a container is displayed, and constraints on the container can be set.

[Container Display Method]

FIGS. 5A to 5D illustrate display rules on the edge of a container.

The layout editing application 121 draws an edge by using a solid line 503 (item) or dotted line 504 in order to represent the state of the container edge. The layout editing application 121 also uses anchors 506, 507, and 509 (lines, shapes, or icons drawn near the edge of a container), a handle 502 (control point drawn on or near the edge of an area for movement and modification), the slider 413 (short parallel lines drawn on the two sides of an edge: see FIG. 4), a scaling icon 505, and the color.

The rules of the container display method shown in FIGS. 5A to 5D are as follows.

(1) In order to fix each edge, the edge is drawn in a solid line.

(2) When the width is fixed, the right and left edges are drawn in solid lines.

(3) When the height is fixed, the upper and lower edges are drawn in solid lines.

(4) No axis is drawn.

(5) Scaling icons are drawn near edges which are not drawn by rules (1) to (3), and these edges are drawn in dotted lines.

(6) If a pair of vertical and horizontal edges or vertical and horizontal axes is fixed, an anchor is drawn at the intersection.

(7) If no anchor is drawn on any fixed edge, a slider is drawn at the center of the edge.

(8) If neither anchor nor slider is drawn on a pair of vertical and horizontal edges or vertical and horizontal axes, a handle is drawn at the intersection.

Lines defined by rules (1), (2), and (3) are drawn in solid lines because these lines are fixed or restricted, as described above. A flexible line is drawn in a dotted line, as defined by rule (5). Anchors are displayed at fixed points defined by rules (6), (7), and (8), sliders are displayed on several fixed edges, and handles are displayed for other components.

The above rules give priority to a constraint set later by the user. More specifically, when another constraint is set later and the rules influence an edge to be drawn, the drawing contents of solid and dotted lines are changed. For example, when a container is so small that icons overlap each other or another display function becomes obscure, the icons may be changed or omitted to draw lines.

The place at which a flexible edge is drawn depends on the contents of a container. As will be described later, a "dynamic calibration process" is employed which means that contents are merged into a document template and visualized on a user interface. Alternate execution can be achieved by another means for deciding where a flexible edge is laid out in a user interface or in the content area of a container averaged in all documents.

These content representations provide a graphic function of displaying the state of each edge of a container. The representations are interpreted as follows.

(1) A dotted line means that the position of an edge in a document changes depending on the contents of a container, like the edge 410 in FIG. 4.

(2) The solid edge 414 means a fixed edge or an edge restricted because the width or height of a container is fixed (the four edges of the container 408 are drawn in solid lines and both the width and height are fixed).

(3) An anchor means that a place where edges or axes cross each other is fixed. Anchor points appear at horizontal and vertical positions in all documents, and anchors are naturally fixed. The icon 409 in FIG. 4 is an example of the anchor icon meaning that the position where the edges 414 cross each other is fixed.

(4) A slider means that the length of an associated edge is fixed but may be translated. For example, the slider 413 in FIG. 4 represents that the contents of the container 408 may be displayed left or right to a position given by a specific diagram in a document.

For example, when the image size or text amount of data flowed into the container 407 associated with the container 408 (link is set between them) is small, the size of the container 407 decreases. Thus, the container 408 is slid (translated) to the left, laid out, and displayed. When the size of the container 407 increases, the container 408 is slid to the right and laid out.

Some or all of these icons and edges are drawn or are not drawn depending on which of tools and containers is selected, highlighted, or made active. Generally, the edges and icons of a container are assistance to design a document template, and are not drawn on a printed material.

As described above, settings of a basic pattern such as the default, minimum, and maximum values of the width and height of a container are displayed in a secondary dialog window.

In FIG. 5A, both the width and height of a container 501 are not fixed (are flexible). A solid edge 503 is represented in a solid line, and a flexible edge 504 is represented in a dotted line. A scaling icon 505 exhibits that the adjacent edge 504 is flexible. An indicator in another form may be used instead or additionally.

In FIG. 5B, both the width and height of the container 501 are flexible. An anchor icon 506 is so added as to explicitly represent that the corner position between two crossing edges 503 is fixed.

FIG. 5C shows a state in which both the width and height of the container 501 are flexible, and the container 501 can be equally enlarged in directions around the central point, as indicated by an arbitrary anchor icon 507. That is, the container 501 can be enlarged or reduced using the anchor icon 507 as a center. In enlargement/reduction, the layout is adjusted so that the position of the anchor icon 507 is always kept at the central point of the container 501.

In FIG. 5D, an upper edge 508 of the container 501 is fixed, but both the width and height are flexible. The anchor icon 509 positioned at the center of the upper edge 508 is fixed. The left and right edges (502) of the container 501 pass the anchor icon 509 and move apart from or close to the vertical center axis (vertical axis).

[Link]

A link indicates association between containers. The association represents a distance between containers, and containers associated by a link execute layout calculation upon a change in their layouts. For example, the link 412 in FIG. 4 associates the containers 407 and 408 with each other, as described above. The link setting method and the layout calculation method for containers associated by a link will be described later.

[Link Setting Method]

Setting of a link for associating containers will be explained.

Figure 6:
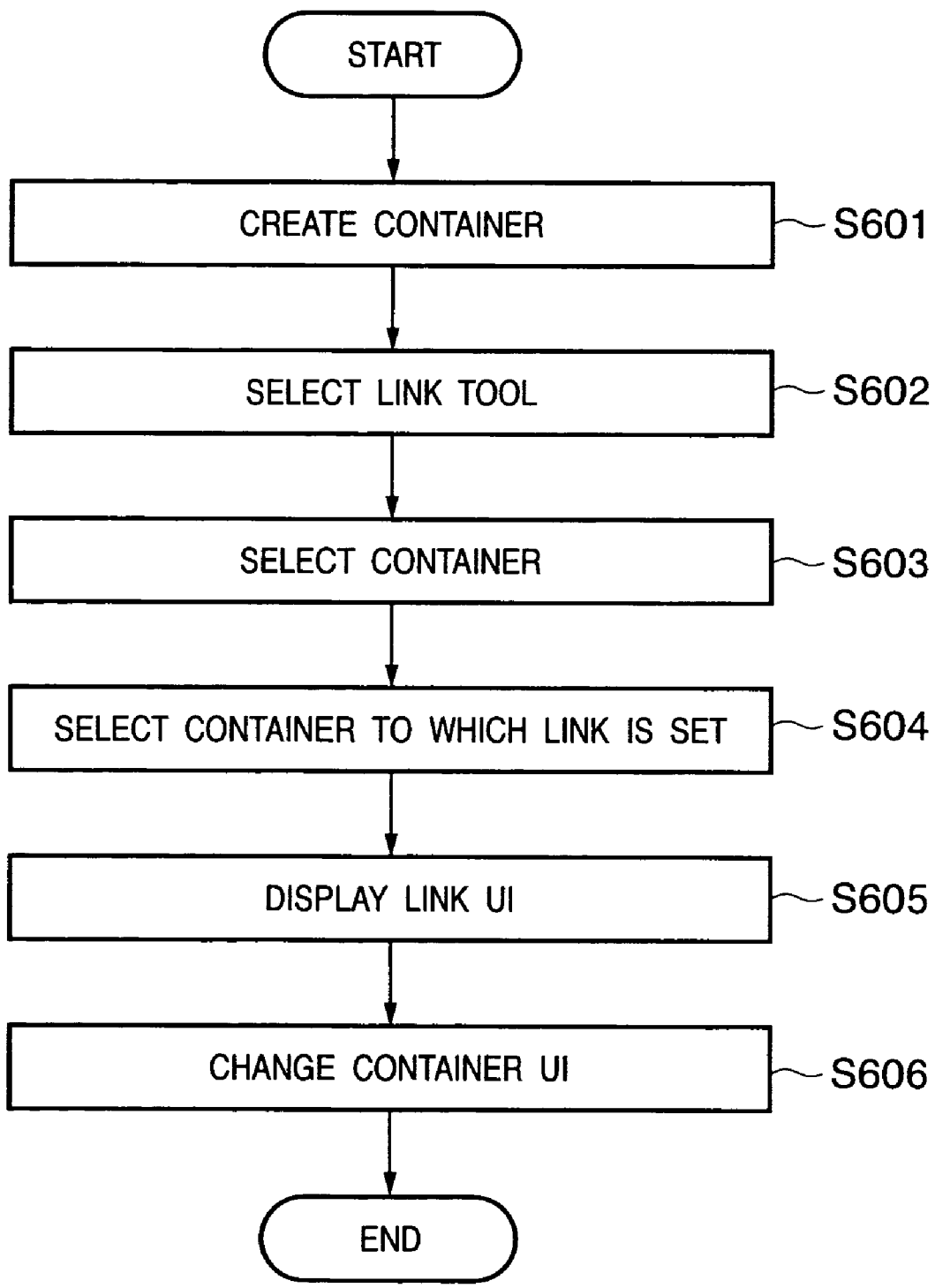
FIG. 6 is a flowchart showing a link setting process according to the embodiment of the present invention.

FIG. 6 is a flowchart showing a link setting process according to the embodiment of the present invention. FIGS. 7A to 7C are views showing an example of transition of a user interface in setting a link according to the embodiment of the present invention. The method of setting a link between containers will be explained with reference to FIGS. 6 and 7A to 7C.

In step S601, the layout editing application 121 displays a document template selected as an editing target in the work area 306 of the user interface. In order to set a link, (at least two) containers to which a link is to be set must be created on the document template. FIGS. 7A to 7C show an example of transition of the user interface when two containers are created and a link is set in step S601.

In step S602, the layout editing application 121 selects a link tool (the link tool is selected by clicking the button 406 in FIG. 4).

In FIG. 7A, containers 701 and 702 are made up of fixed edges. Reference numerals 703 and 704 denote anchors, similar to 409 in FIG. 4. Reference numeral 705 denotes a mouse pointer.

While the link tool is selected, the user clicks on and selects one (e.g., the container 701) of two containers to which a link is to be set. In accordance with this operation, the user interface 103 of the layout editing application 121 recognizes that the first container has been selected (step S603), and holds information which specifies the selected container.

A locus corresponding to subsequent movement of the mouse cursor is displayed on the screen. For example, a line segment 706 in FIG. 7 exhibits a line which connects a click position in the state of FIG. 7A and the current position of the mouse pointer 705. A UI indicated by the line segment 706 can present the user with a position at which a link is set.

As shown in FIG. 7B, the user moves the mouse pointer 705 to the other container (container 702) and clicks. In accordance with this operation, the user interface 103 recognizes that the second container has been selected (step S604), and holds information which specifies the selected container.

The layout editing application 121 sets a link between the first container selected in step S603 and the second container selected in step S604.

After the link is set between the two containers 701 and 702 selected by the user, a link 707 is displayed (step S605). In response to the link setting, the container display state changes to a state in FIG. 7C (step S606).

That is, the container UI is automatically changed upon setting the link. In this case, edges associated by the link become flexible and are drawn in dotted lines. In FIG. 7C, reference numeral 708 denotes an edge which is drawn in a dotted line and is a flexible edge, as described above.

The state of the container edge as shown in FIG. 7C is automatically changed when the need for making the container edge flexible arises upon setting a link. A purpose of this operation is to prevent a contradictory state in which all edges are fixed though a link is set. Reference numeral 709 denotes a mark which, similar to 505 in FIG. 5, visually presents the user with a direction in which a container can be changed upon setting a link. In the example of FIG. 7C, the right edge of the left container and the left edge of the right container change to a flexible state, but this is merely an example. The right container may change to a setting having the slider 413 in FIG. 4.

<Layout Calculation Process by Layout Engine>

[Layout Calculation Method (Overall Flow)]

The layout editing application 121 according to the embodiment has at least two modes. One is a layout mode in which containers are created using the user interface 103 and associated (link is set) to create a layout. The other is a preview mode in which each record in the data source is inserted into a created layout by the layout engine 105 and a layout result to which the record is actually inserted is previewed.

In the preview mode, an actual record is inserted, and the layout is calculated. In the preview mode, layout calculation on the display is performed. In actual printing, the layout engine 105 inserts data into each container and calculates the layout, and the calculation method at this time is the same as that in the preview mode.

Figure 8:
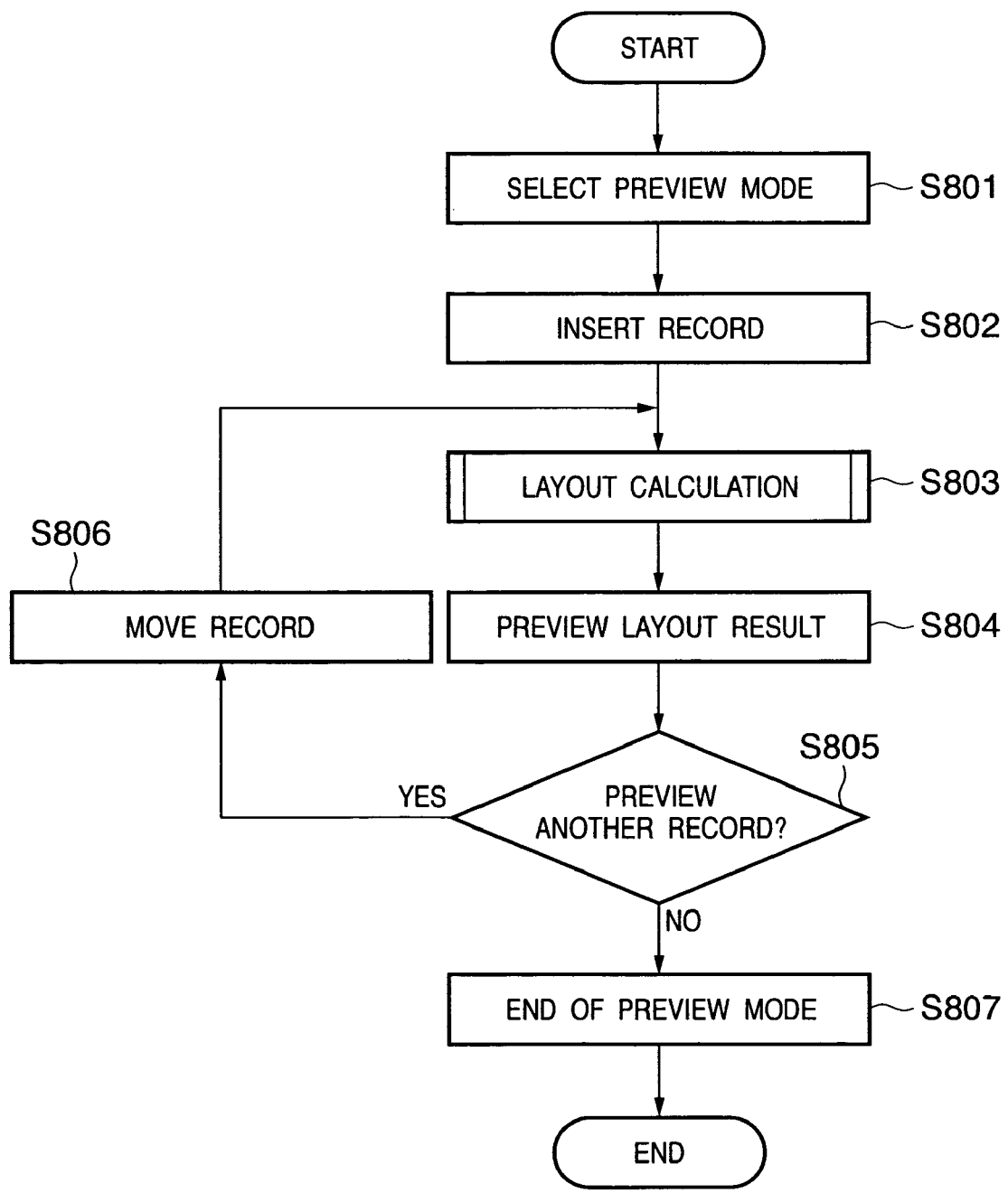
FIG. 8 is a flowchart showing a layout calculation process according to the embodiment of the present invention.

FIG. 8 is a flowchart showing the layout calculation process according to the embodiment of the present invention.

The preview mode is selected (step S801). In the preview mode, the layout editing application 121 prompts the user to select a record to be previewed from the data source, and inserts each field data of the selected record into each container (step S802).

After the field data is inserted into each container, the layout editing application 121 executes layout calculation for laying out the record, and if necessary, adjusts the layout (step S803). Details of layout calculation in step S803 will be described later.

The layout editing application 121 displays (previews) the layout calculated in step S803 (step S804). The layout editing application 121 determines on the basis of an instruction from the user whether to preview another record (step S805). If another record need not be previewed in step S805 (NO in step S805), the preview mode ends (step S807).

If another record needs to be previewed (YES in step S805), the layout editing application 121 selects another record, executes layout calculation again, and previews the calculated layout (step S806).

In printing, unlike the preview mode, layout calculation is sequentially performed for all records to be printed. In printing, therefore, step S804 is omitted, and whether all records to be printed have been processed is determined in step S805. In step S803, the results of layout calculation are drawn, output, and generated as print data using the printer driver, thereby outputting the print data to the printer. In this case, the process ends when print data are output for all records (all records to be printed).

[Layout Calculation Method (Details)]

Details of layout calculation in step S803 will be explained with reference to FIG. 9.

Figure 9:
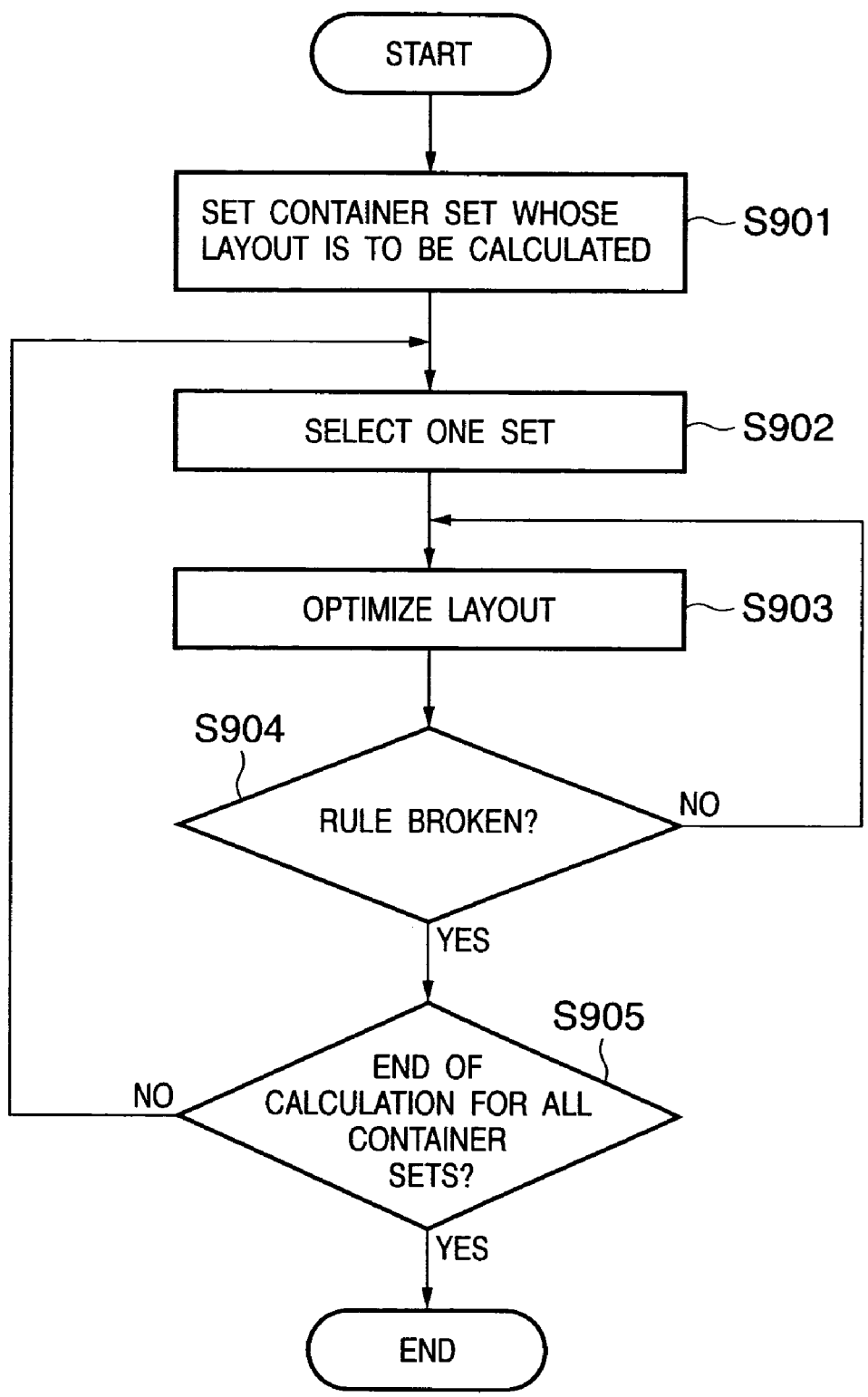
FIG. 9 is a flowchart showing details of the layout calculation process according to the embodiment of the present invention.

FIG. 9 is a flowchart showing details of the layout calculation process according to the embodiment of the present invention.

FIG. 9 is a flowchart for explaining only the layout calculation process, and this flow corresponds to a layout calculation process in printing/previewing of one record in variable data printing. For a plurality of records, the following process is repeated.

The layout editing application 121 sets a set of containers whose layout is to be calculated (step S901). Layout calculation is done for associated containers as one set.

Figure 10:
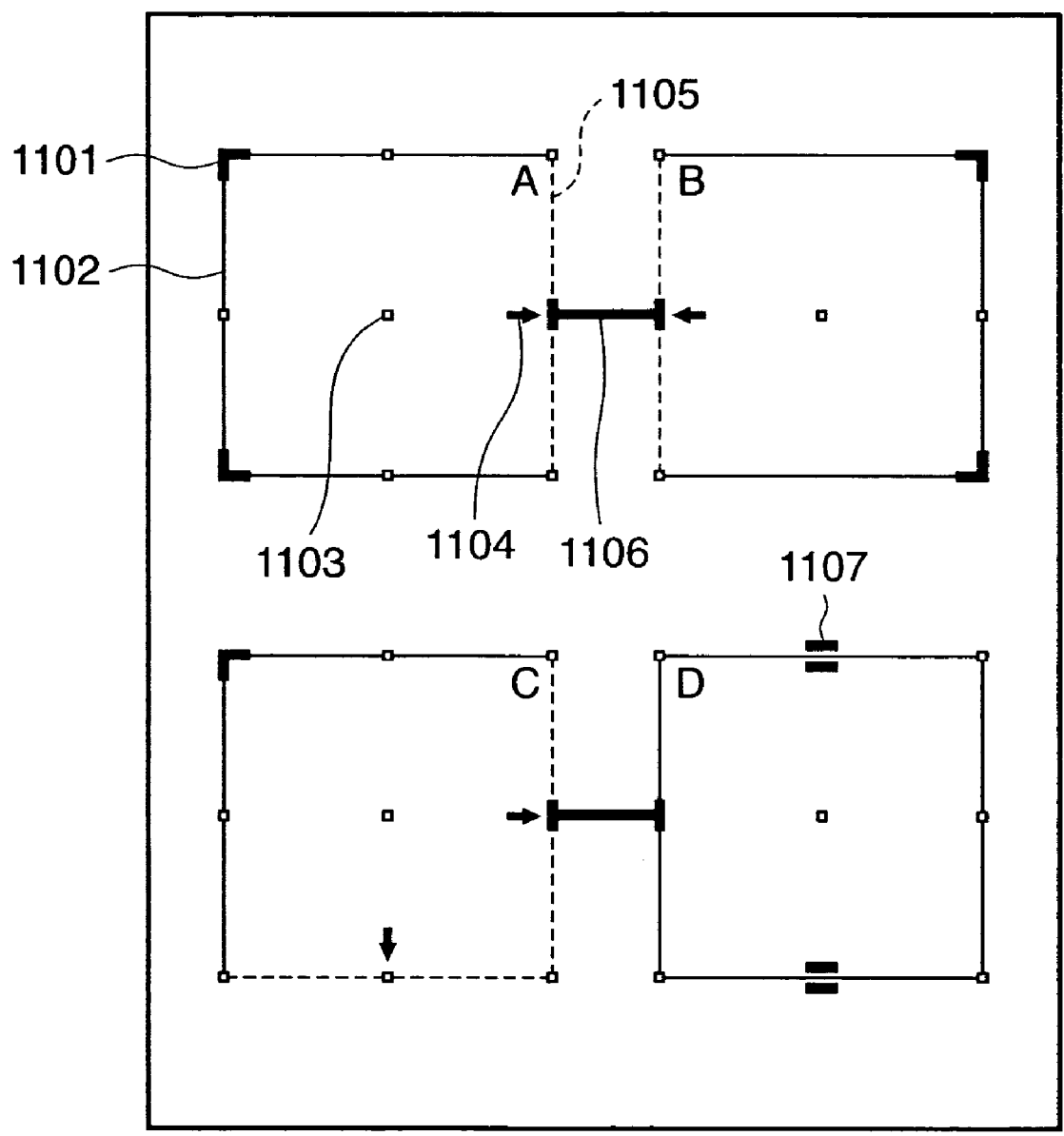
FIG. 10 is a view for explaining a set of containers in the layout calculation process according to the embodiment of the present invention.

For example, referring to FIG. 10, four containers are laid out on a page, and association is set between the containers. In this case, containers A and B are associated by a link, whereas containers C and D are associated by a link.

Containers A and B are specified as set 1, whereas containers C and D are specified as set 2. In other words, containers connected by a link are specified as one set. As described above, reference numeral 1101 denotes an anchor; 1102, a fixed edge; 1103, a controller; 1104, an arrow indicating a direction in which a flexible edge changes; 1105, a flexible edge; 1106, a link; and 1107, a slider.

The layout editing application 121 selects one of the container sets obtained in step S901 in order to calculate a layout (step S902). The layout is calculated for the selected container set.

For two containers A and B as flexible elements contained in the selected container set, a size when each container is free from any constraint is calculated from the image size or text amount of data to be flowed.

More specifically, the layout editing application 121 determines whether container A is an image data container or text container. This determination is made on the basis of an attribute set for the container, as described above.

Then, the layout editing application 121 loads data flowed into container A. When container A is an image data container, the size (the numbers of pixels corresponding to the width and height, and resolution) of the image data is a size when container A is free from any constraint.

When container A is a text container, the amount of text data to be flowed into container A can be calculated on the basis of the number of characters and character attributes (e.g., the font type, font size, character pitch, and line pitch) designated by the container attributes of container A.

For a text container, constraints are imposed because the aspect ratio of container A cannot be decided unless constraints are taken into consideration. In the example of FIG. 10, anchors are set at the upper and lower left corners of container A, and its height (longitudinal direction) is fixed. The layout editing application 121 determines whether characters of a calculated data amount (text amount) can be flowed into container A having a width (lateral direction) set as the basic pattern of container A.

If the layout editing application 121 determines that all characters can be flowed, the size (width and height) of container A that are set by the basic pattern is not changed. If the layout editing application 121 determines that all characters cannot be flowed, container A extends in the lateral direction because the height is fixed by anchor setting. The layout editing application 121 calculates the width of container A at which characters of the calculated data amount can be flowed, and thereby calculates the size of container A.

The layout editing application 121 optimizes the layout so as to minimize the difference between the size of the laid-out container and that of actual contents (step S903).

The layout is optimized so that the difference between the layout size and the size of contents to be inserted into a container is minimized in each of containers which are so associated as to dynamically change their sizes.

The layout editing application 121 calculates the size of the container set that is calculated in step S902, i.e., the total size of containers A and B and link 1106 (in this case, fixed link). The layout editing application 121 calculates the difference between the total size and the size (in the example of FIG. 10, corresponding to the distances of the anchor icons of containers A and B) of the container set in the basic layout. If containers A and B become wider, a difference value is generated after calculation in the previous step. The layout editing application 121 adjusts the layout by equally distributing the difference value to respective elements of the container set.

The layout editing application 121 optimizes the layout, and determines whether the layout breaks the rules (step S904). If the layout does not break rules (YES in step S904), the process advances to step S905. If the layout breaks the rules (NO in step S904), the process returns to step S903 to calculate the layout again so as not to break the rules.

The rules are constraints set by the user in creating a layout, and include constraints on the flexible range of the size of a container, and the position of the container, and for a flexible link, a constrain on a change of the length of the link. After the layout editing application 121 calculates the layout so as not to break the rules, the layout of the set is completed.

The process from steps S902 to S904 is performed for all sets on the page, and the layout editing application 121 determines whether the layout of the entire page has been calculated (step S905). If the calculation has not ended (NO in step S905), the process returns to step S902. If the calculation has ended (YES in step S905), the process ends.

An example of a UI in the above-described layout calculation will be explained with reference to FIGS. 11A to 11C.

FIGS. 11A to 11C are views showing an example of a user interface in the layout calculation process according to the embodiment of the present invention.

FIG. 11A shows a state in which a given record is inserted and the layout is decided. Reference numerals 1001 and 1002 denote anchors; 1003 and 1004, fixed edges; 1005, a flexible edge; 1006, an arrow indicating a direction in which a flexible edge changes; and 1108, a link. In this state, a record is changed, and contents of different sizes are inserted.

FIG. 11B shows the size of new contents over the state of FIG. 11A. Reference numeral 1009 denotes a size of contents which are inserted into each container. After that, the layout is calculated.

FIG. 11C shows the result of layout calculation. The size of each container after calculation is so calculated as to have a difference equal to that of the size of contents to be actually inserted, and not to break the above-mentioned rules. As shown in FIG. 11C, the inserted-content size 1009 shown in FIG. 11B and a calculated content size 1010 have the same difference.

The automatic layout process which is a feature of the present invention and realizes automatic layout of an optimal container will be explained below.

According to the present invention, filtering is applied to various records stored in the database 119 on the basis of a predetermined conditional expression (in general, this expression means to extract records in accordance with an SQL (Structured Query Language) statement), creating a database table formed from records which satisfy the predetermined condition.

An example of the database table will be described with reference to FIG. 12.

FIG. 12 is a table showing an example of the database table according to the embodiment of the present invention.

In the database table in FIG. 12, records each having a plurality of types of data fields are managed by record numbers for uniquely identifying the records. In each record, field data serving as item data which forms the record is managed by a data field name.

In the embodiment, contents (texts or images) stored in a plurality of types of field data (in FIG. 12, field data having data field names "product concept", "product image", "feature 1", "feature 2", and "description") which are contained in each record are loaded one by one from the database table. The data display size (content size (e.g., rectangular size)) of data stored in each data field is calculated.

In size calculation, for image contents, a rectangular size is calculated from the longitudinal and lateral sizes of image contents are calculated. For text contents, a rectangular size necessary to display one character string containing no line feed before a composition process such as word wrap is calculated.

Average field data (data field having a data display size (rectangular size) closest to an average rectangular size) having the most average rectangular size (average rectangular size) among rectangular sizes calculated for respective field data in the record is chosen for each data field name. Chosen average field data are combined into one average field set (one form of a reference field set).

The average field set can be displayed on, e.g., a field set list window implemented on the palette 311 of FIG. 3.

The average field set list window will be explained with reference to FIG. 13A.

Figure 13A:
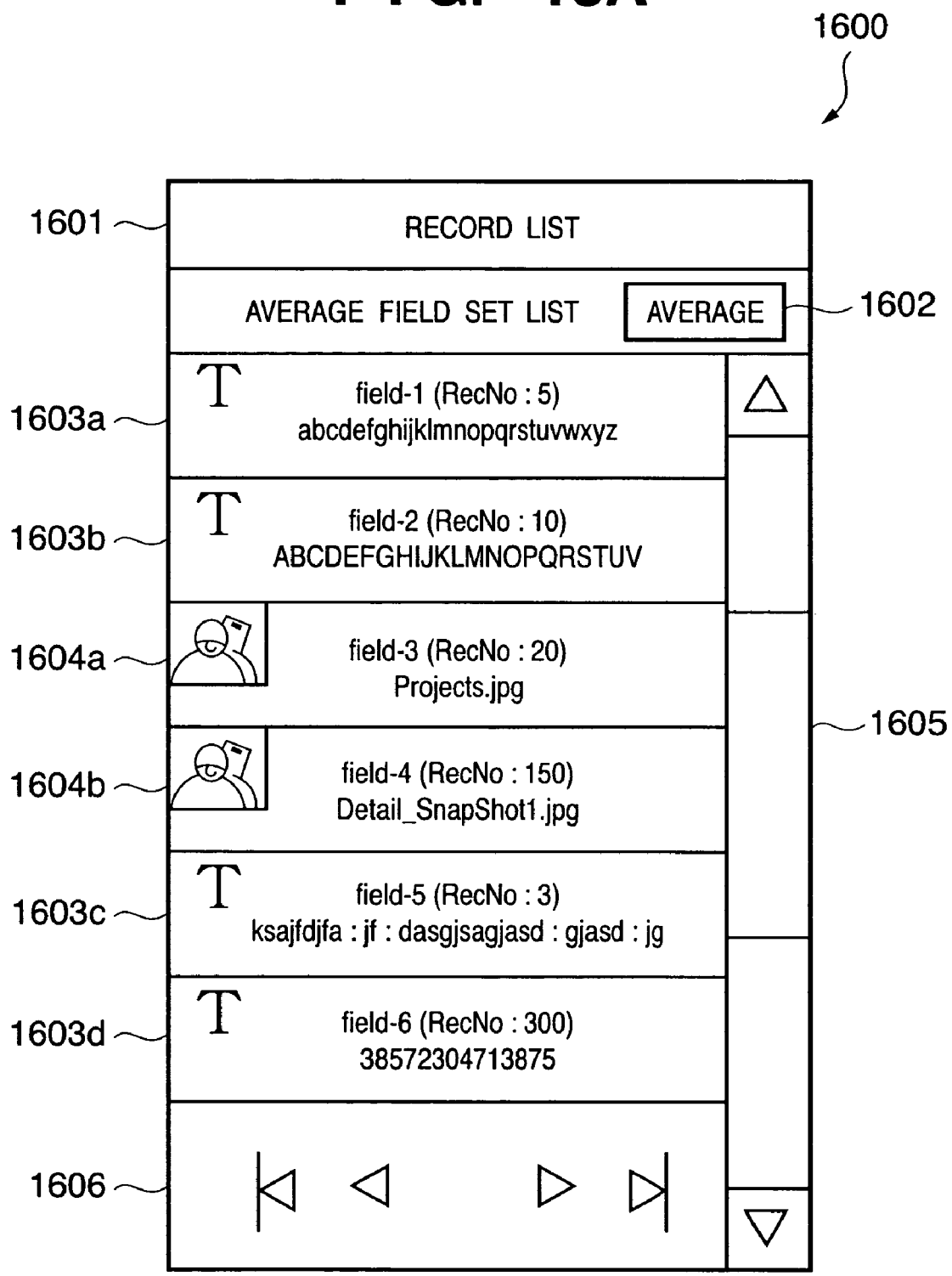
FIG. 13A is a view showing an example of a field set list window according to the embodiment of the present invention.
Figure 13B:
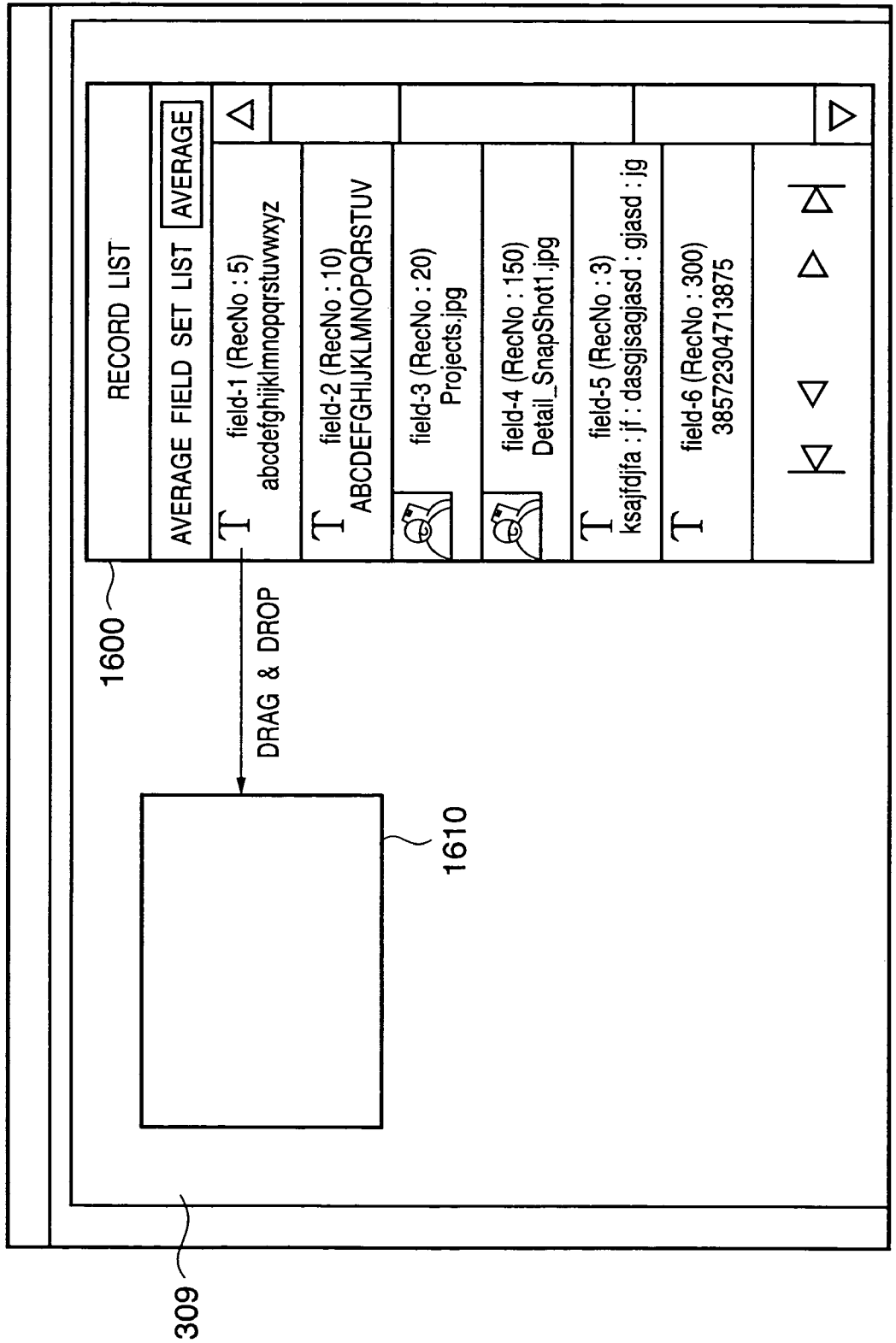
FIG. 13B is a view for explaining a content layout method using the field set list window according to the embodiment of the present invention.

FIG. 13A is a view showing an example of the field set list window according to the embodiment of the present invention.

A field set list window 1600 in FIG. 13A has a function of switching the field data group (field set) of a desired record in the database 119 between records and displaying the switched field set. In addition to this, the field set list window 1600 has a function of displaying, for each field data, the above-mentioned average field set which is formed from field data having an average rectangular size.

FIG. 13A shows a state in which the average field set is displayed. The field set list window 1600 has, as basic control tools, a title bar 1601, a control button 1602 which activates the average field set list function, a scroll bar 1605, and a record jump control button 1606 (when an average field set is display, the button 1606 is unnecessary and disabled).

The field set list window displays the field name of each field data which forms a field set, a record number to which the field data belongs, and the outline of contents. The type of contents is displayed by an icon. For text contents, a text string as actual contents is displayed, and for image contents, a corresponding image file name is displayed.

In FIG. 13A, reference numerals 1603*a* to 1603*d* denote text content information display areas each representing that field data is a text content. Reference numerals 1604*a* and 1604*b* denote image content information display areas each representing that field data is an image content.

For example, the text content information display area 1603*a* is made up of a text icon (arranged at the left corner) representing that field data is a text, a field name "field-1", a record number (RecNo: 5) to which the field data belongs, and a text character string "abicdefghije . . . " as an outline of the content.

The image content information display area 1604*a* is made up of an icon (arranged at the left corner) representing that field data is an image, a field name "field-3", a record number (RecNo: 20) to which the field data belongs, and an image file name (Products.jpg) as an outline of the image content.

When the field set list window 1600 is used in the embodiment, a document template is first created by the procedures described in [Display and Editing of Container]. Then, a container associated with each field data in the field set list window 1600 can be laid out in the created document template.

Especially when an average field set list is displayed in the field set list window 1600, containers associated with field data having an average rectangular size in many records can be laid out in the document template.

The container layout using the field set list window 1600 can be realized by, for example, selecting a desired content information display area in the field set list window 1600, and dragging and dropping the selected area onto the document template.

Accordingly, a container associated with field data corresponding to the selected content information display area is laid out on the document template on the basis of the data display size of the field data.

When the field set list window 1600 is an average field set list window, a content 1610 to be laid out is defined in size on the basis of the data display size of average field data having the most average rectangular size among records, and can be laid out on the document template 309.

That is, a document template can be created using field data having the most average content size. This can minimize the difference in layout when records are automatically laid out. As a result, adjustment work after automatic layout can be minimized.

An example of display of a document template on which containers are laid out will be explained with reference to FIG. 14.

Figure 14:
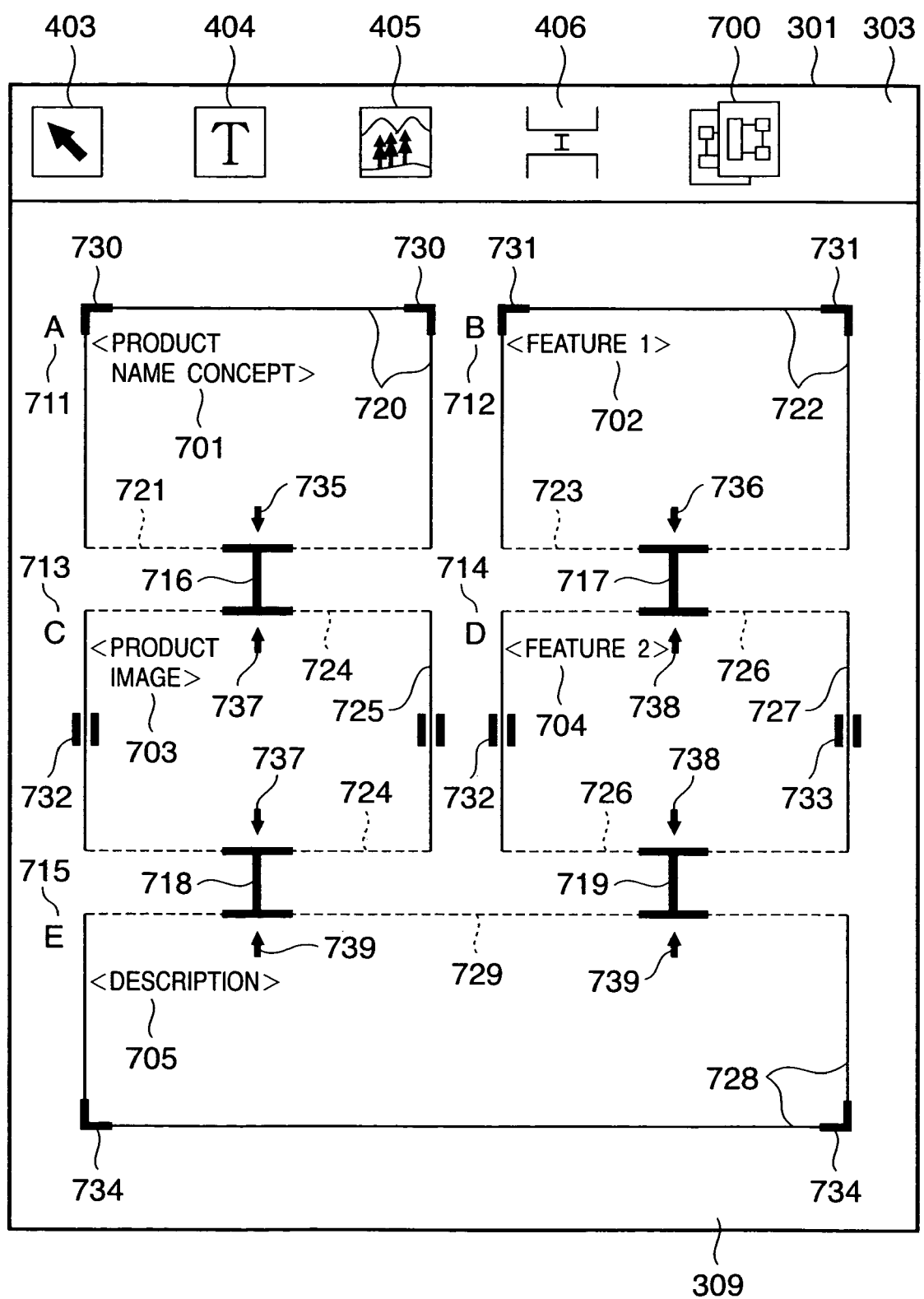
FIG. 14 is a view showing an example of display of a document template according to the embodiment of the present invention.

FIG. 14 is a view showing an example of display of the document template according to the embodiment of the present invention.

FIG. 14 is a partial view showing details of the application window 301 in FIGS. 3 and 4. The same reference numerals denote the same parts.

In FIG. 14, a button 700 is a multi-record button, and when the operator clicks the multi-record button 700, a multi-record container can be created within a template page. The multi-record container is used to successively lay out data in a plurality of records within the same page.

For example, when the database holds five records, a multi-record container is laid out in a template page. Data of a corresponding data field in the first record is inserted at the layout position, and data of the second record is inserted rightward from the position of the multi-record container. If no more data can be laid out rightward, data are laid out downward. Data are successively laid out until data of all record are inserted.

In FIG. 14, container A (711), container B (712), container C (713), container D (714), and container E (715) are laid out on the document template 309. These containers are made up of typical anchor icons 730, 731, and 734, fixed edges 720, 722, 725, 727, and 728, and flexible edges 721, 723, 724, 726, and 729. Typically, a fixed edge is indicated by a solid line, and a flexible edge is indicated by a dotted line.

An anchor icon is arranged at the corner of a container, and is a function representing that the corner is designated to a fixed position on the document template 309 and does not move from the position.

Since each container has a flexible edge, indicators 735, 736, 377, 378, and 739 each representing a direction in which an edge flexibly moves are displayed in corresponding containers. The indicator is a function representing that the edge of each container can flexibly move in a direction (and opposite direction) indicated by the indicator.

Sliders 732 and 733 are displayed each of which represents that the container size can flexibly increase and decrease in the longitudinal direction. The slider is typically displayed beside a fixed edge. In this case, the slider 733 is attached to the fixed edge 727 of container D (714). The fixed edge 727 does not change in position in the lateral direction, but the flexible edge 726 exists in the longitudinal direction, and container D (714) can expand or contract at a flexible length in the longitudinal direction.

<Product name concept> (701) is displayed as a text in container A (711); <feature 1> (702), in container B (712); <product image> (703), in container C (713); <feature 2> (704), in container D (714); and <description> (705), in container E (715). These texts are an example representing association with data field names (column names) in records of the database 119 and information on the data field.

In this example, the text of the product name concept is inserted as data into container A (711). Texts representing the features of a product presented by the product name concept in container A (711) are inserted as data into container B (712) and container D (714). The image of the product presented by the product name concept in container A (711) is inserted as data into the container C (713). The text of the description of the product presented by the product name concept in container A (711) is inserted into container E (715).

In FIG. 14, the document template 309 on which containers A to E are laid out is laid out on the basis of the average field set. This example exhibits a result of laying out containers by using field data having the most average content size among field data having the same field named (same data field name) in records in the database.

Thereafter, the layout calculation process is executed by the layout engine 105 for the laid-out container, and actual contents can be displayed.

A display example (display in the preview mode) when each field data in a designated record (in this case, a record having an average field set) is inserted into the document template 309 will be explained with reference to FIG. 15.

Figure 15:
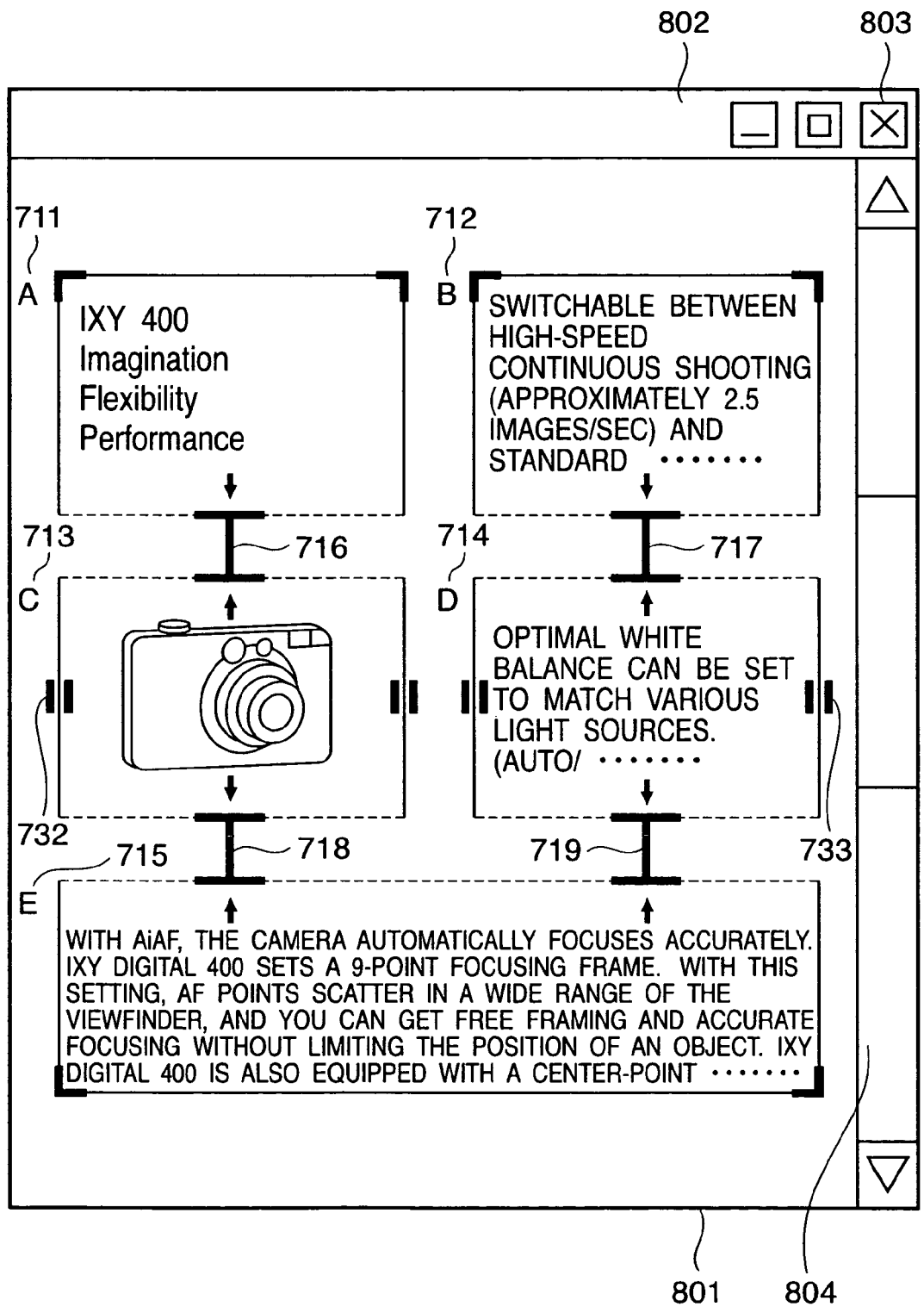
FIG. 15 is a view showing an example of preview display of the document template according to the embodiment of the present invention.

FIG. 15 is a view showing an example of preview display of the document template according to the embodiment of the present invention.

FIG. 15 particularly illustrates an example in which the contents of each field data in a designated record (in this case, a record having an average field set) are actually inserted into the document template 309 in FIG. 14.

In FIG. 15, a layout view window 801 is displayed in the application window 301. The layout view window 801 is typically made up of a title bar 802, tool buttons 803 used to maximize, minimize, and close the window, and a window scroll bar 804.

The layout view window 801 presents a layout result of inserting field data in a designated record, in this case, a record having an average field set into containers A to E on the document template in FIG. 14.

Text data are inserted into container A (711), container B (712), container D (714), and container E (715), while image data is inserted into container C (713). The layout result of the layout view window 801 is a layout result intended by the user in which the layout of containers and the layout of data in the containers are well balanced, similar to the layout in FIG. 14.

A characteristic process according to the embodiment will be described in detail.

A field list creation process of creating an average field set will be explained with reference to FIG. 16.

Figure 16:
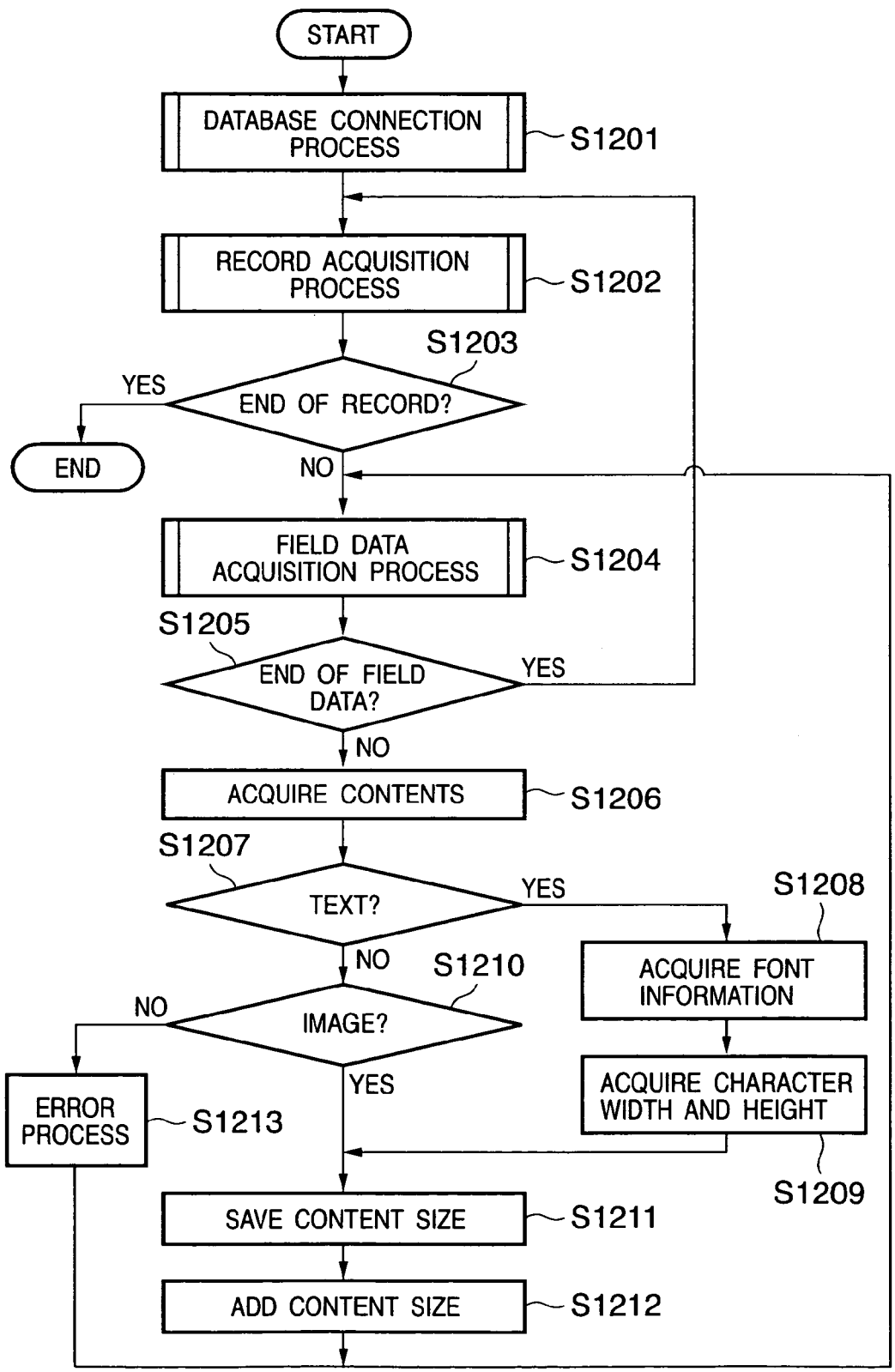
FIG. 16 is a flowchart showing a field list creation process according to the embodiment of the present invention.

FIG. 16 is a flowchart showing the field list creation process according to the embodiment of the present invention.

The layout editing application 121 executes a database connection process (step S1201). Details of this process will be omitted because the database is connected via a general database driver (e.g., an ODBC driver). The database assumes records extracted from the database 119 of the database server 117 under desired conditions. The records can be sequentially accessed by a general record acquisition process.

The layout editing application 121 then executes a record acquisition process of acquiring records from the connected database (step S1202). The contents of the acquired records are temporarily stored in a work area in the memory 136. The layout editing application 121 determines whether all records to be processed have been acquired (step S1203). If all records have been acquired (YES in step S1203), the process ends.

If all records have not been acquired (NO in step S1203), the layout editing application 121 executes a field data acquisition process of acquiring field data to be processed from field data in the records (step S1204). The contents (field information) of the acquired field data are sequentially stored in a field list linear list (to be referred to as a field list hereinafter) ensured in the work area in the memory 136.

The field list will be explained with reference to FIG. 17.

Figure 17:
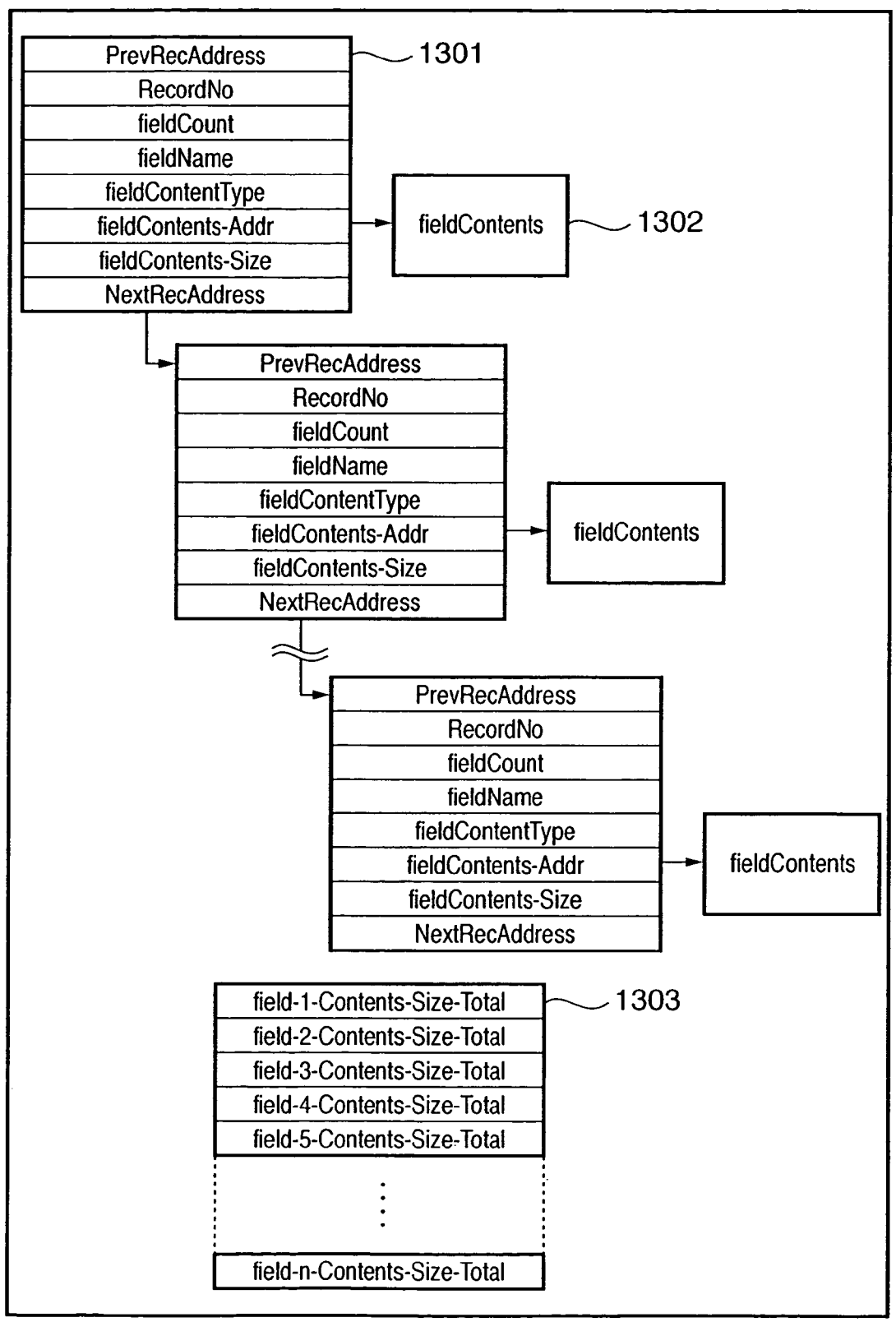
FIG. 17 is a view showing an example of a field list according to the embodiment of the present invention.

FIG. 17 is a view showing an example of the field list according to the embodiment of the present invention.

In FIG. 17, reference numeral 1301 denotes a field, list. Every time field data is acquired, the field information is sequentially registered in the field list. PrevRecAddress at the start of the field list 1301 stores the address of a previous field list. RecordNo stores a record number; fieldCount, a field cont; fieldName, a field name; fieldContentType, the type of contents (text, image, or the like); fieldContentsAddr, an address at which the entity of contents (fieldContents 1302) is stored; fieldContentsSize, a content size calculated by a process to be described later; and NextRecAddress, an address in the work area of the memory 136 at which the next field information is stored.

Reference numeral 1303 denotes a work area (to be referred to as a total field list hereinafter) used to add the field data display sizes (content sizes) of field data (field-N-Contents-Size-Total: N is a field number) having the same field name (same data field name). This work area stores the sum of field data ;display sizes having the same field name (same data field) for all records.

Referring back to the description of FIG. 16, the layout editing application 121 determines whether all field data in the record have been acquired (step S1205). If the acquisition has ended (YES in step S1205), the process returns to step S1202 in order to acquire the next record to be processed. If the acquisition has not ended (NO in step S1205), contents as actual data stored in the field data are acquired (step S1206).

The layout editing application 121 then determines whether the acquired contents are text data (step S1207). If the acquired contents are text data (YES in step S1207), the layout editing application 121 acquires font information defined for the container (step S1208). The font information includes the font type, font size, and character interval (character spacing).

The layout editing application 121 acquires a character string width and character height necessary for a character string (line feed is ignored) from character string data serving as text contents on the basis of the acquired information on the font type, size, and line spacing (step S1209).

As a method of acquiring the character string width, for example, a character string width which considers each character width can be acquired by invoking, via a drawing object called a device context, a module called Graphic Display Interface (popularly called GDI) provided by Microsoft Windows® OS. The GDI invoking method may change depending on the type of OS, but the present invention can adopt any acquisition method as far as a character string width can be acquired.

When no character string width can be acquired via the OS, a character width and height are defined using a typical character, e.g., "A" as a criterion for calculating a character string width, and the character string width can be calculated by simply multiplying character width by the number of characters.

If the acquired contents are not text data in step S1207 (NO in step S1207), the layout editing application 121 determines whether the acquired contents are image data (step S1210). If the acquired contents are not image data (NO in step S1210), the acquired contents are neither text data nor image data but unknown data, and the layout editing application 121 stops the process for the contents as an error process (step S1213).

If the acquired contents are image data (YES in step S1210), the layout editing application 121 calculates a content size (rectangular size) on the basis of the image width and height which are held as the attributes of the image contents (step S1211). When the flow passes through the process in step S1209, the content size (rectangular size) is calculated on the basis of the character string width and character height of the acquired text contents (step S1211).

The calculation result is stored as a field size (content size) in fieldContents-Size of the field list 1301 in FIG. 17. At the same time, the calculation result is added to a total size stored in field-n-Contents-Size-Total serving as the total field list 1303.

The average value of field data display sizes (content sizes) can be calculated for the same field name (same data field name) by an average field set creation process (to be described later) on the basis of the calculated sum of field sizes.

By repeating the above process by the number of records, field information containing the sizes of fields in each record, and the sum of the field sizes of the fields can be calculated.

The average field creation process of creating average field data by using a field list created in the field list creation process will be explained with reference to FIG. 18.

Figure 18:
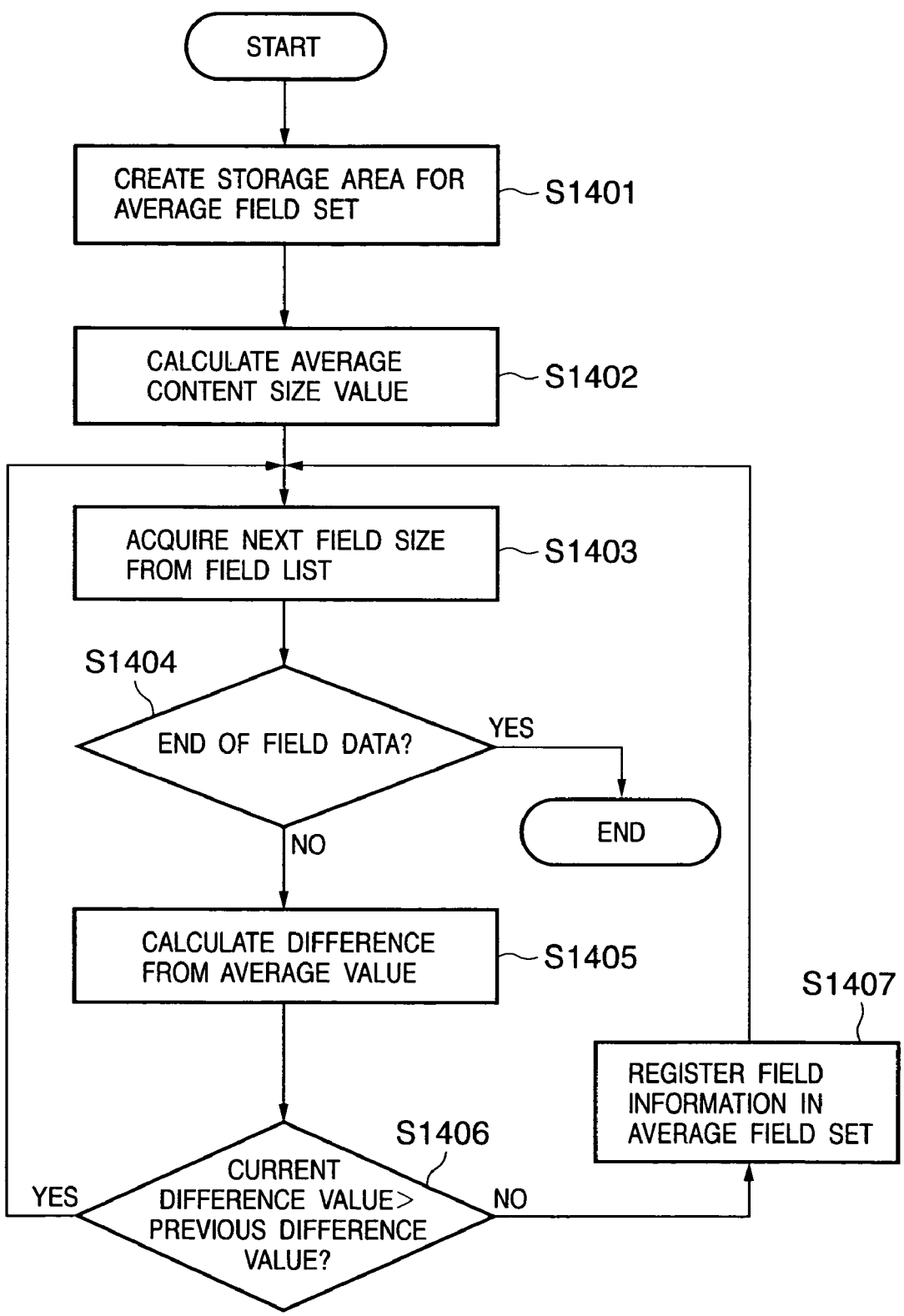
FIG. 18 is a flowchart showing an average field set creation process according to the embodiment of the present invention.

FIG. 18 is a flowchart showing the average field set creation process according to the embodiment of the present invention.

The layout editing application 121 ensures a free area for one record in the memory 136 in order to store an average field set having the field list structure of FIG. 17 (step S1401). At this time, "99999999" is set as the maximum value of the difference at fieldContents-Size. For the average field set, fieldContents-Size stores the minimum difference value.

The average data display size (average content size) of field data is calculated from the number of records and the sum of the content sizes of fields that is stored in the total field list created by the field list creation process (step S1402). The calculated average content size value is overwritten in the total field list, finally providing an average field value list.

In order to compare each field size (content size) stored in the field list with the average content size of corresponding field data in the average field value list, the field data display size of field data to be processed is acquired from the field list (step S1403).

The layout editing application 121 determines whether the field sizes of all field data in the field list have been acquired (step S1404). If the acquisition has ended (YES in step S1404), the process ends. If the acquisition has not ended (NO in step S1404), the layout editing application 121 calculates the difference between the content size of field data to be processed and the average content size value (step S1405).

The layout editing application 121 compares the currently calculated difference value (current difference value) and a previously stored difference value (previous difference value) of the field data that is stored in the average field set (step S1406). If the current difference value is larger than the previous difference value (YES in step S1406), the difference value is not updated, and the process returns to step S1403 to acquire the next field to be processed from the field list.

If the current difference value is equal to or smaller than the previous difference value (NO in step S1406), field information (PrevRecAddress, RecordNo, fieldNo, fieldName, fieldContentType, fieldContentsAddr, and NextRecAddress excluding fieldContents-Size) of the field data in the field list is copied to the data field in the average field set, thereby updating the average field set (step S1407).

By repeating the above process for all records and all field data, an average field set formed from field data having a content size closest to the average content size can be created.

A display process of creating and displaying a field set list window by using a created average field set will be described with reference to FIG. 19.

Figure 19:
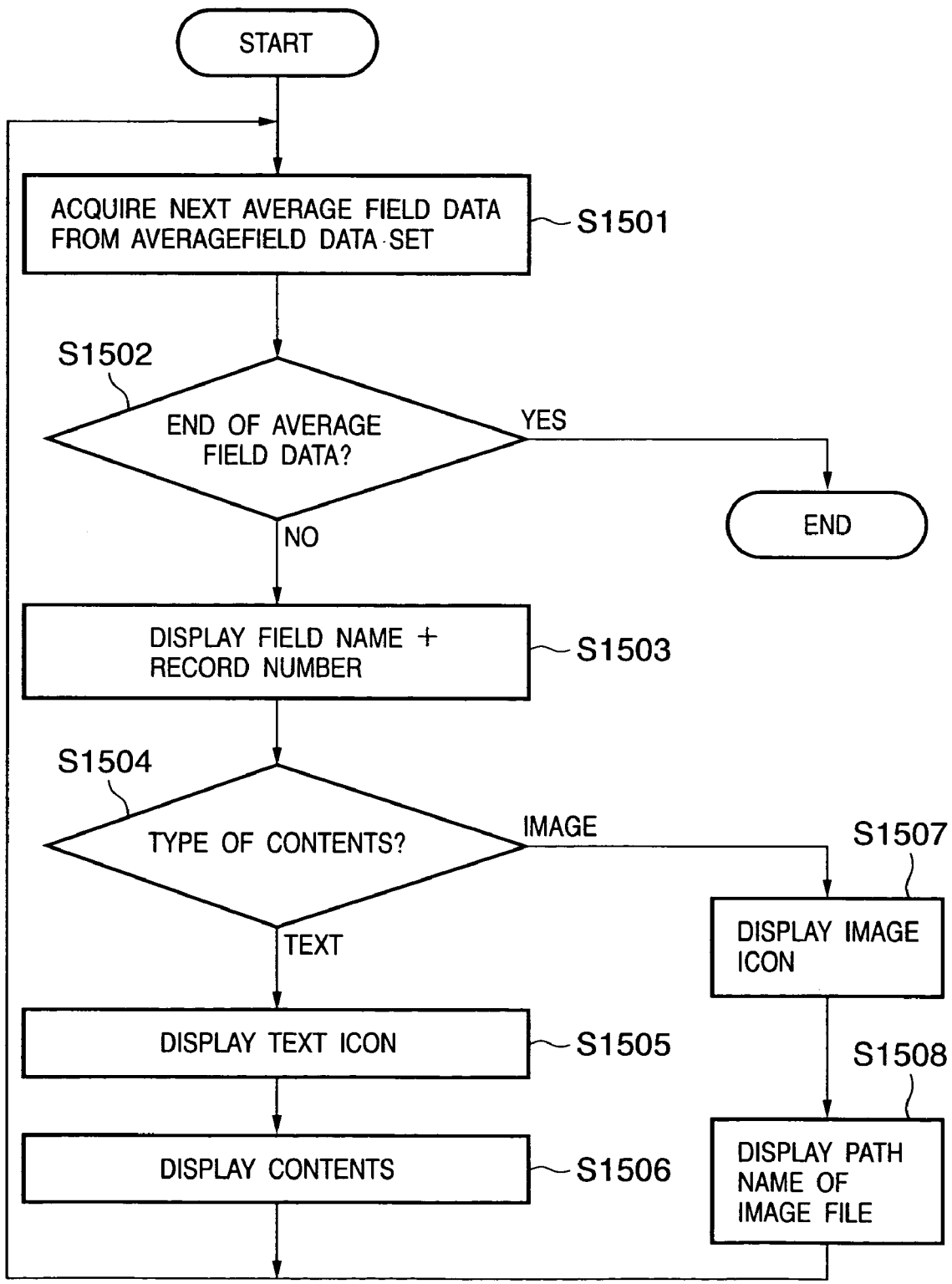
FIG. 19 is a flowchart showing a field set list window display process according to the embodiment of the present invention.

FIG. 19 is a flowchart showing the field set list window display process according to the embodiment of the present invention.

In particular, FIG. 19 shows a process of displaying an average field set list in the field set list window. The process in FIG. 19 is executed by operating, for example, the control button 1602 in FIG. 13A. However, the present invention is not limited to this, and the processes in FIGS. 16, 18, and 19 described above may be executed as a series of processes by operating the control button 1602 in FIG. 13A.

The layout editing application 121 acquires field information of average field data to be processed from an average field set obtained by the above process (step S1501). The layout editing application 121 determines whether all average field data have been acquired from the average field set (step S1502). If the acquisition has ended (YES in step S1502), the process ends.

If the acquisition has not ended (NO in step S1502), the layout editing application 121 creates a character string "field name (record number)" from the field name (fieldname) and record number (RecordNo) in field information of the acquired average field data, and displays the character string at a corresponding portion in the field set list window 1600 shown in FIG. 13A.

The layout editing application 121 determines, from fieldContentType in the field information, whether the type of contents stored in the average field data represents text contents or image contents (step S1504).

If the type of contents represents a text, the layout editing application 121 displays a text icon representing the text contents in a corresponding text content information display area (step S1505). In the example of FIG. 13A, the text icon is displayed at the start of the field name. The layout editing application 121 displays the text contents as much as possible in the text content information display area (step S1506). Text contents which cannot be displayed are clipped in the text content information display area.

If the type of contents represents image contents, the layout editing application 121 displays a content icon representing the image contents in a corresponding image content information display area (step S1507). In the example of FIG. 13A, the image icon is displayed at the start of the field name. The layout editing application 121 displays the file name of the image file as much as possible.

By executing the above process for all average field data in the average field set, the average field set list window shown in FIG. 13A can be created and displayed.

Although not shown in FIG. 13A, the average field set list window can also comprise a scaling control button. When scaling operation is executed with this control button, each content information display area is enlarged/reduced in accordance with the operation.

As described above, according to the embodiment, when a container is laid out on a document template by using records, the document template is created using field data having the most average content size among field data having the same field name (same data field name) in records.

This process can minimize the difference in layout when containers associated with field data of each record are automatically laid out. That is, adjustment work after automatic layout can be minimized, and user-friendliness can be further improved.

In the embodiment, field data having the most average content size as a predetermined condition is chosen from field data having the same field name (same data field name) in records. The chosen field data are created as an average field set. By using the average field set, the layout of containers on the document template is created.

When a document template is created using field data in the average field set, the data display size of the field data serves as a reference size used to layout data of the field data on the document template.

Thus, the average field set can be regarded as a reference field set serving as a criterion for creating a layout.

Field data which forms the reference field set is obtained from an average data field in the embodiment, but the present invention is not limited to this. For example, field data which satisfies another predetermined condition such as the maximum or minimum content size can be chosen for each identical data field, and a data field set formed from chosen data fields can be defined as a reference data field set.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-231440 filed on Aug. 6, 2004, the entire contents of which are hereby incorporated by reference herein.

What is claimed is:

1. An information processing apparatus including a processor that lays out, in a page, a field area in which content data included in a record is inserted, the apparatus comprising:
   an identifying unit adapted to perform identification processing to identify content data for each of a plurality of data items included in a single record, wherein, by performing the identification processing for a plurality of records, the identifying unit identifies content data for each of a plurality of data items included in each of the plurality of records;
   a deciding unit adapted to decide an average size for the content data in each of the plurality of data items based on a display size of the content data for a same data item included in each of the plurality of records identified by the identifying unit;
   a choosing unit adapted to choose content data used as a reference size from the content data for the same data item included in each of the plurality of records by comparing (1) the average size decided by the deciding unit for the same data item with (2) the display size of the content data for the same data item included in each of the plurality of records, wherein the choosing unit chooses content data used as the reference size for each of the plurality of data items;
   a display unit adapted to display an operation window that includes data item information for each of the plurality of data items, wherein data item information for a data item includes an attribute of content data chosen by the choosing unit and a record number indicating a record in which the content data chosen by the choosing unit is included; and
   a layout unit adapted to lay out, in the page, the field area having the display size of content data corresponding to a record number indicated by information selected from the data item information in the operation window displayed by the display unit.

2. The apparatus according to claim 1, wherein the deciding unit decides the reference size for each of a plurality of types of data items in the record, and wherein the choosing unit chooses content data having a display size corresponding to the reference size chosen by the choosing unit for each of the plurality of types of data items.

3. The apparatus according to claim 1, wherein the deciding unit includes a calculation unit for, if content data of a data item to be processed is image data, calculating a display size of the image data from longitudinal and lateral sizes of the image data, and, if the content data is text data, calculating a display size of the text data based on designated font information.

4. The apparatus according to claim 1, further comprising:
   an inserting unit adapted to insert content data contained in a record into a field area on a template page on which the layout unit lays out the field area; and a print data generating unit adapted to generate print data to be printed by a printing apparatus based on the template page in which the content data is inserted by the inserting unit.

5. A method performed by an information processing apparatus that lays out, in a page, a field area in which content data included in a record is inserted, the method comprising steps of:

performing identification processing to identify content data for each of a plurality of data items included in a single record, wherein, by performing the identification processing for a plurality of records, content data for each of a plurality of data items is identified included in each of the plurality of records; deciding an average size for the content data in each of the plurality of data items based on a display size of each of the content data for a same data item included in each of the plurality of records identified;

choosing content data used as a reference size from the content data for the same data item included in each of the plurality of records by comparing (1) the average size decided for the same data item with (2) the display size of content data for the same data item included in each of the plurality of records, wherein the choosing step chooses content data used as the reference size for each of the plurality of data items;

displaying an operation window that includes data item information for each of the plurality of data items, wherein data item information for a data item includes an attribute of content data chosen in the choosing step and a record number indicating a record in which the content data chosen in the choosing is step included; and laying out, in the page the field area having the display size of the content data corresponding to a record number indicated by information selected from the data item information in the operation window displayed in the displaying step.

6. A computer-readable medium storing computer-executable program code for implementing a control method of an information processing apparatus that lays out, in a page, a field area in which content data included in a record is inserted, the method comprising steps of:

performing identification processing to identify content data for each of a plurality of data items included in a single record, wherein, by performing the identification processing for a plurality of records, content data for each of a plurality of data items is identified included in each of the plurality of records;

deciding an average size for the content data in each of the plurality of data items based on a display size of each of the content data for a same data item included in each of the plurality of records identified;

choosing content data used as a reference size from the content data for the same data included in each of the plurality of records by comparing (1) the average size decided for the same data item with (2) the display size of content data for the same data item included in each of the plurality of records, wherein the choosing step chooses content data used as the reference size for each of the plurality of data items;

displaying an operation window that includes data item information for each of the plurality of data items, wherein data item information for a data item includes an attribute of content data chosen in the choosing step and a record number indicating a record in which the content data chosen in the choosing step is included; and laying out, in the page, the field area having the display size of the content data corresponding to a record number indicated by information selected from the data item information in the operation window displayed in the displaying step.

7. The computer-readable medium according to claim 6, wherein the reference size for each of a plurality of types of data items in the record is decided, and wherein the content data having a display size corresponding to the reference size is chosen for each of the plurality of types of data items.

8. The computer-readable medium according to claim 6, wherein, if content data of a data item to be processed is image data, a display size of the image data is calculated from longitudinal and lateral sizes of the image data, and, if the content data is text data, a display size of the text data is calculated based on designated font information.

9. The computer-readable medium according to claim 6, wherein the method further comprises steps of:

inserting content data contained in a record into an area on a template page on which the field area is laid out; and generating print data to be printed by a printing apparatus based on the template page in which the content data is inserted.

* * * * *